US007708628B2

(12) United States Patent
Baerlocher

(10) Patent No.: US 7,708,628 B2
(45) Date of Patent: May 4, 2010

(54) GAMING DEVICE HAVING A MULTIPLE COORDINATE AWARD DISTRIBUTOR

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 886 days.

(21) Appl. No.: 10/630,529

(22) Filed: Jul. 30, 2003

(65) Prior Publication Data

US 2005/0026671 A1 Feb. 3, 2005

(51) Int. Cl.
*A63D 9/24* (2006.01)
*A63F 13/00* (2006.01)

(52) U.S. Cl. ..................... 463/17; 463/16; 463/18; 463/25; 463/30

(58) Field of Classification Search .................. 463/10, 463/21, 30, 16–22, 31; 273/138.1, 139, 141 A, 273/141 R, 142 B, 142 D, 142 E, 142 F, 142 G, 273/143 B
See application file for complete search history.

(56) References Cited

U.S. PATENT DOCUMENTS

| | | | | |
|---|---|---|---|---|
| 1,527,929 A | | 2/1925 | Simons | |
| 2,095,367 A | * | 10/1937 | Mattson | 273/142 HA |
| 2,283,583 A | * | 5/1942 | Singer | 273/142 HA |
| 2,565,557 A | * | 8/1951 | Guimond | 273/142 A |
| 3,642,287 A | | 2/1972 | Lally et al. | |
| 3,804,419 A | * | 4/1974 | Jackson | 273/142 HA |
| 3,817,532 A | * | 6/1974 | Lee | 273/142 HA |
| 4,077,631 A | * | 3/1978 | Tela, Sr. | 273/142 E |
| 4,198,052 A | | 4/1980 | Gauselmann | |
| 4,448,419 A | | 5/1984 | Telnaes | |
| 4,492,378 A | * | 1/1985 | Williams | 273/142 HA |
| 4,508,357 A | | 4/1985 | Reich | |
| 4,509,754 A | * | 4/1985 | Remmler et al. | 273/142 J |
| 4,560,161 A | | 12/1985 | Hamano | |
| 4,582,324 A | | 4/1986 | Koza et al. | |

(Continued)

FOREIGN PATENT DOCUMENTS

AU 199717601 B2 9/1997

(Continued)

OTHER PUBLICATIONS

American Bandstand Game description written by IGT, published in 2001.

(Continued)

*Primary Examiner*—John M Hotaling, II
*Assistant Examiner*—Steven J. Hylinski
(74) *Attorney, Agent, or Firm*—K&L Gates, LLP

(57) ABSTRACT

A gaming device for providing awards to players. The gaming device includes an award distributor such as an award wheel having a plurality of sections, each of the sections having or defined by first and second coordinates, a plurality of award symbols included on the sections, an illumination device associated with the sections, a section indicator associated with the award wheel and a processor in communication with the award wheel. The gaming device determines the first coordinate of one of the groups of sections. Then, the gaming device or player spins the award wheel and the section indicator determines the second coordinate of one of the sections in the group, which indicates the section. The gaming device provides any award or symbol to the player that is associated with the indicated section.

46 Claims, 14 Drawing Sheets

U.S. PATENT DOCUMENTS

| | | | | |
|---|---|---|---|---|
| 4,624,459 | A | 11/1986 | Kaufman | |
| 4,674,748 | A * | 6/1987 | Wismer | 273/141 R |
| 4,695,053 | A | 9/1987 | Vazquez, Jr. et al. | |
| 4,775,155 | A | 10/1988 | Lees | |
| 4,838,552 | A | 6/1989 | Hagiwara | |
| 4,991,848 | A | 2/1991 | Greenwood et al. | |
| 5,085,436 | A | 2/1992 | Bennett | |
| 5,096,196 | A * | 3/1992 | Gutknecht et al. | 273/142 HA |
| 5,102,134 | A | 4/1992 | Smyth | |
| 5,118,110 | A * | 6/1992 | Jones | 273/141 R |
| 5,178,390 | A | 1/1993 | Okada | |
| 5,188,363 | A * | 2/1993 | Marnell et al. | 463/13 |
| 5,205,555 | A | 4/1993 | Hamano | |
| 5,232,222 | A * | 8/1993 | Deutch | 273/142 HA |
| 5,308,065 | A | 5/1994 | Bridgeman et al. | |
| 5,324,041 | A | 6/1994 | Boylan et al. | |
| 5,332,228 | A | 7/1994 | Schultz | |
| 5,342,047 | A | 8/1994 | Heidel et al. | |
| 5,393,061 | A | 2/1995 | Manship et al. | |
| 5,411,271 | A * | 5/1995 | Mirando | 463/9 |
| 5,423,539 | A | 6/1995 | Nagao | |
| 5,431,408 | A | 7/1995 | Adams | |
| 5,449,173 | A | 9/1995 | Thomas et al. | |
| 5,456,465 | A | 10/1995 | Durham | |
| 5,524,888 | A | 6/1996 | Heidel | |
| 5,536,016 | A | 7/1996 | Thompson | |
| 5,542,669 | A | 8/1996 | Charron et al. | |
| 5,553,851 | A * | 9/1996 | Malavazos et al. | 273/142 E |
| 5,560,603 | A | 10/1996 | Seelig et al. | |
| 5,569,084 | A | 10/1996 | Nicastro et al. | |
| 5,584,763 | A * | 12/1996 | Kelly et al. | 463/16 |
| 5,584,764 | A | 12/1996 | Inoue | |
| 5,609,524 | A | 3/1997 | Inoue | |
| 5,611,535 | A | 3/1997 | Tiberio | |
| 5,636,838 | A * | 6/1997 | Caro | 273/142 E |
| 5,711,525 | A | 1/1998 | Breeding | |
| 5,722,891 | A | 3/1998 | Inoue | |
| 5,769,716 | A | 6/1998 | Saffari et al. | |
| 5,772,509 | A | 6/1998 | Weiss | |
| 5,775,692 | A | 7/1998 | Watts et al. | |
| 5,788,573 | A | 8/1998 | Baerlocher et al. | |
| 5,810,361 | A | 9/1998 | Kadlic | |
| 5,823,873 | A | 10/1998 | Moody | |
| 5,823,874 | A | 10/1998 | Adams | |
| 5,833,537 | A | 11/1998 | Barrie | |
| 5,833,538 | A | 11/1998 | Weiss | |
| 5,848,932 | A | 12/1998 | Adams | |
| 5,851,148 | A | 12/1998 | Brune et al. | |
| 5,873,781 | A | 2/1999 | Keane | |
| 5,882,261 | A | 3/1999 | Adams | |
| 5,902,184 | A | 5/1999 | Bennett et al. | |
| 5,911,418 | A | 6/1999 | Adams | |
| 5,919,091 | A | 7/1999 | Bell et al. | |
| 5,927,714 | A | 7/1999 | Kaplan | |
| 5,935,002 | A | 8/1999 | Falciglia | |
| 5,947,820 | A | 9/1999 | Morro et al. | |
| 5,951,397 | A | 9/1999 | Dickinson | |
| 5,964,463 | A | 10/1999 | Moore, Jr. | |
| 5,967,894 | A | 10/1999 | Kinoshita et al. | |
| 5,980,384 | A | 11/1999 | Barrie | |
| 5,984,781 | A | 11/1999 | Sunaga | |
| 5,988,643 | A | 11/1999 | Awada | |
| 5,989,121 | A | 11/1999 | Sakamoto | |
| 5,996,997 | A * | 12/1999 | Kamille | 273/139 |
| 5,997,400 | A | 12/1999 | Seelig et al. | |
| 5,997,401 | A | 12/1999 | Crawford | |
| 6,004,207 | A | 12/1999 | Wilson, Jr. et al. | |
| 6,007,066 | A * | 12/1999 | Moody | 273/292 |
| 6,015,346 | A * | 1/2000 | Bennett | 463/20 |
| 6,019,369 | A | 2/2000 | Nakagawa et al. | |
| 6,033,307 | A | 3/2000 | Vancura | |
| 6,056,642 | A | 5/2000 | Bennett | |
| 6,059,289 | A | 5/2000 | Vancura | |
| 6,059,290 | A * | 5/2000 | Neil | 273/243 |
| 6,059,658 | A * | 5/2000 | Mangano et al. | 463/16 |
| 6,062,980 | A | 5/2000 | Luciano | |
| 6,089,976 | A | 7/2000 | Schneider et al. | |
| 6,089,977 | A | 7/2000 | Bennett | |
| 6,089,978 | A | 7/2000 | Adams | |
| 6,093,102 | A | 7/2000 | Bennett | |
| 6,102,798 | A | 8/2000 | Bennett | |
| 6,105,962 | A * | 8/2000 | Malavazos et al. | 273/143 R |
| 6,120,031 | A | 9/2000 | Adams | |
| 6,126,541 | A | 10/2000 | Fuchs | |
| 6,126,542 | A | 10/2000 | Fier | |
| 6,129,355 | A | 10/2000 | Hahn et al. | |
| 6,142,873 | A * | 11/2000 | Weiss et al. | 463/20 |
| 6,142,874 | A | 11/2000 | Kodachi et al. | |
| 6,142,875 | A | 11/2000 | Kodachi et al. | |
| 6,146,271 | A | 11/2000 | Kadlic | |
| 6,146,273 | A | 11/2000 | Olsen | |
| 6,149,156 | A | 11/2000 | Feola | |
| 6,149,157 | A | 11/2000 | Suan | |
| 6,155,925 | A | 12/2000 | Giobbi et al. | |
| 6,159,095 | A | 12/2000 | Frohm et al. | |
| 6,159,096 | A | 12/2000 | Yoseloff | |
| 6,159,097 | A | 12/2000 | Gura | |
| 6,159,098 | A | 12/2000 | Slomiany et al. | |
| 6,162,121 | A | 12/2000 | Morro et al. | |
| 6,164,652 | A | 12/2000 | Lauretta et al. | |
| 6,168,520 | B1 | 1/2001 | Baerlocher et al. | |
| 6,168,523 | B1 | 1/2001 | Piechowiak et al. | |
| 6,173,955 | B1 | 1/2001 | Perrie et al. | |
| 6,174,233 | B1 | 1/2001 | Sunaga et al. | |
| 6,174,235 | B1 * | 1/2001 | Walker et al. | 463/25 |
| 6,186,894 | B1 | 2/2001 | Mayeroff | |
| 6,190,254 | B1 | 2/2001 | Bennett | |
| 6,190,255 | B1 | 2/2001 | Thomas et al. | |
| 6,203,427 | B1 * | 3/2001 | Walker et al. | 463/16 |
| 6,203,429 | B1 | 3/2001 | Demar et al. | |
| 6,210,279 | B1 | 4/2001 | Dickinson | |
| 6,213,876 | B1 | 4/2001 | Moore, Jr. | |
| 6,217,022 | B1 * | 4/2001 | Astaneha | 273/138.1 |
| 6,220,959 | B1 | 4/2001 | Holmes, Jr. et al. | |
| 6,224,483 | B1 * | 5/2001 | Mayeroff | 463/20 |
| 6,227,969 | B1 | 5/2001 | Yoseloff | |
| 6,227,971 | B1 | 5/2001 | Weiss | |
| 6,231,442 | B1 | 5/2001 | Mayeroff | |
| 6,231,445 | B1 | 5/2001 | Acres | |
| 6,234,897 | B1 | 5/2001 | Frohm et al. | |
| 6,251,013 | B1 | 6/2001 | Bennett | |
| 6,257,979 | B1 * | 7/2001 | Walker et al. | 463/13 |
| 6,261,177 | B1 | 7/2001 | Bennett | |
| 6,270,409 | B1 | 8/2001 | Shuster | |
| 6,299,165 | B1 | 10/2001 | Nagano | |
| 6,299,170 | B1 | 10/2001 | Yoseloff | |
| 6,302,398 | B1 | 10/2001 | Vecchio | |
| 6,302,790 | B1 | 10/2001 | Brossard | |
| 6,305,686 | B1 | 10/2001 | Perrie et al. | |
| 6,309,299 | B1 | 10/2001 | Weiss | |
| 6,309,300 | B1 | 10/2001 | Glavich | |
| 6,311,976 | B1 | 11/2001 | Yoseloff et al. | |
| 6,312,334 | B1 | 11/2001 | Yoseloff | |
| 6,315,663 | B1 | 11/2001 | Sakamoto | |
| 6,315,664 | B1 | 11/2001 | Baerlocher et al. | |
| 6,319,124 | B1 | 11/2001 | Baerlocher et al. | |
| 6,322,078 | B1 | 11/2001 | Adams | |
| 6,322,309 | B1 * | 11/2001 | Thomas et al. | 413/20 |
| 6,328,649 | B1 | 12/2001 | Randall et al. | |
| 6,336,860 | B1 | 1/2002 | Webb | |
| 6,336,863 | B1 * | 1/2002 | Baerlocher et al. | 463/27 |
| 6,346,043 | B1 | 2/2002 | Colin et al. | |
| 6,347,996 | B1 | 2/2002 | Gilmore et al. | |
| 6,358,144 | B1 | 3/2002 | Kadlic et al. | |

| | | | | |
|---|---|---|---|---|
| 6,364,766 | B1 | 4/2002 | Anderson et al. | |
| 6,364,767 | B1 * | 4/2002 | Brossard et al. | 463/20 |
| 6,375,187 | B1 | 4/2002 | Baerlocher | |
| 6,375,570 | B1 | 4/2002 | Poole | |
| 6,394,902 | B1 | 5/2002 | Glavich et al. | |
| 6,398,218 | B1 | 6/2002 | Vancura | |
| 6,398,644 | B1 * | 6/2002 | Perrie et al. | 463/18 |
| 6,406,369 | B1 | 6/2002 | Baerlocher et al. | |
| 6,413,160 | B1 | 7/2002 | Vancura | |
| 6,413,161 | B1 | 7/2002 | Baerlocher et al. | |
| 6,413,162 | B1 | 7/2002 | Baerlocher et al. | |
| 6,419,579 | B1 | 7/2002 | Bennett | |
| 6,435,511 | B1 | 8/2002 | Vancura et al. | |
| 6,439,943 | B1 | 8/2002 | Aoki et al. | |
| 6,439,993 | B1 | 8/2002 | O'Halloran | |
| 6,439,995 | B1 | 8/2002 | Hughs-Baird et al. | |
| 6,443,452 | B1 | 9/2002 | Brune | |
| 6,443,837 | B1 | 9/2002 | Jaffe et al. | |
| 6,454,266 | B1 | 9/2002 | Breeding et al. | |
| 6,461,241 | B1 | 10/2002 | Webb et al. | |
| 6,464,582 | B1 | 10/2002 | Baerlocher et al. | |
| 6,491,584 | B2 | 12/2002 | Graham et al. | |
| 6,494,454 | B2 | 12/2002 | Adams | |
| 6,494,785 | B1 | 12/2002 | Gerrard et al. | |
| 6,506,117 | B2 | 1/2003 | DeMar et al. | |
| 6,506,118 | B1 | 1/2003 | Baerlocher et al. | |
| 6,514,141 | B1 | 2/2003 | Kaminkow et al. | |
| 6,536,766 | B1 * | 3/2003 | Deitch et al. | 273/287 |
| 6,561,512 | B2 * | 5/2003 | Luciano et al. | 273/142 HA |
| 6,561,899 | B2 | 5/2003 | Vancura | |
| 6,561,902 | B1 * | 5/2003 | Walker et al. | 463/25 |
| 6,569,015 | B1 | 5/2003 | Baerlocher et al. | |
| 6,572,471 | B1 * | 6/2003 | Bennett | 463/16 |
| 6,575,830 | B2 | 6/2003 | Baerlocher et al. | |
| 6,585,591 | B1 | 7/2003 | Baerlocher et al. | |
| 6,595,854 | B2 | 7/2003 | Hughs-Baird et al. | |
| 6,598,877 | B1 * | 7/2003 | Luciano et al. | 273/142 R |
| 6,599,185 | B1 * | 7/2003 | Kaminkow et al. | 463/16 |
| 6,599,192 | B1 | 7/2003 | Baerlocher et al. | |
| 6,604,740 | B1 | 8/2003 | Singer et al. | |
| 6,605,000 | B2 | 8/2003 | Adams | |
| 6,616,142 | B2 | 9/2003 | Adams | |
| 6,620,045 | B2 | 9/2003 | Berman et al. | |
| 6,626,758 | B1 | 9/2003 | Parham et al. | |
| 6,632,139 | B1 | 10/2003 | Baerlocher | |
| 6,632,141 | B2 | 10/2003 | Webb et al. | |
| 6,645,071 | B2 * | 11/2003 | Perrie et al. | 463/16 |
| 6,645,074 | B2 * | 11/2003 | Thomas et al. | 463/20 |
| 6,648,754 | B2 | 11/2003 | Baerlocher et al. | |
| 6,659,864 | B2 | 12/2003 | McGahn et al. | |
| 6,663,488 | B1 | 12/2003 | Adams | |
| 6,692,355 | B2 | 2/2004 | Baerlocher et al. | |
| 6,705,944 | B2 | 3/2004 | Luciano | |
| 6,722,981 | B2 | 4/2004 | Kaminkow et al. | |
| 6,855,056 | B2 * | 2/2005 | Inoue | 463/31 |
| 6,899,625 | B2 * | 5/2005 | Luciano et al. | 463/25 |
| 6,923,441 | B2 * | 8/2005 | Inoue | 273/143 R |
| 6,974,129 | B2 * | 12/2005 | Nordman | 273/143 R |
| 6,988,731 | B2 * | 1/2006 | Inoue | 273/142 H |
| 7,104,886 | B2 * | 9/2006 | Baerlocher et al. | 463/16 |
| 7,169,045 | B2 * | 1/2007 | Nordman | 463/20 |
| 7,306,520 | B2 * | 12/2007 | Kaminkow et al. | 463/20 |
| 2002/0042294 | A1 * | 4/2002 | Pau et al. | 463/16 |
| 2002/0045475 | A1 | 4/2002 | Glavich et al. | |
| 2002/0072402 | A1 | 6/2002 | Baerlocher | |
| 2002/0137559 | A1 | 9/2002 | Baerlocher | |
| 2002/0142822 | A1 | 10/2002 | Baerlocher et al. | |
| 2002/0151350 | A1 | 10/2002 | Baerlocher et al. | |
| 2002/0155883 | A1 | 10/2002 | Baerlocher | |
| 2002/0187827 | A1 | 12/2002 | Blankstein | |
| 2003/0013514 | A1 | 1/2003 | Cregan et al. | |
| 2003/0027628 | A1 | 2/2003 | Luciano | |
| 2003/0036420 | A1 | 2/2003 | Baerlocher et al. | |
| 2003/0040355 | A1 | 2/2003 | Baerlocher | |
| 2003/0040360 | A1 | 2/2003 | Kaminkow | |
| 2003/0045338 | A1 | 3/2003 | Dolloff et al. | |
| 2003/0045344 | A1 | 3/2003 | Webb et al. | |
| 2003/0045348 | A1 | 3/2003 | Palmer et al. | |
| 2003/0045350 | A1 | 3/2003 | Baerlocher et al. | |
| 2003/0060260 | A1 | 3/2003 | Gerrard et al. | |
| 2003/0064773 | A1 | 4/2003 | Baerlocher et al. | |
| 2003/0064795 | A1 | 4/2003 | Baerlocher et al. | |
| 2003/0087693 | A1 | 5/2003 | Baerlocher et al. | |
| 2003/0157982 | A1 | 8/2003 | Gerrard et al. | |
| 2003/0211880 | A1 | 11/2003 | Locke | |
| 2004/0009805 | A1 | 1/2004 | Baerlocher et al. | |
| 2004/0014517 | A1 * | 1/2004 | Inoue | 463/20 |
| 2004/0017041 | A1 * | 1/2004 | Inoue | 273/143 R |
| 2004/0018866 | A1 * | 1/2004 | Inoue | 463/16 |
| 2004/0023708 | A1 * | 2/2004 | Kaminkow et al. | 463/16 |
| 2004/0106444 | A1 | 6/2004 | Cuddy et al. | |
| 2004/0150161 | A1 * | 8/2004 | Inoue | 273/292 |
| 2004/0155399 | A1 * | 8/2004 | Inoue | 273/138.1 |
| 2004/0183251 | A1 * | 9/2004 | Inoue | 273/143 R |

FOREIGN PATENT DOCUMENTS

| | | | |
|---|---|---|---|
| AU | 199917318 | A1 | 9/1999 |
| EP | 0 874 337 | A1 | 10/1998 |
| EP | 0926645 | A2 | 6/1999 |
| EP | 0 945 837 | A2 | 9/1999 |
| EP | 0944030 | A2 | 9/1999 |
| EP | 0981119 | A2 | 2/2000 |
| EP | 0 984 409 | A2 | 3/2000 |
| EP | 0984408 | A2 | 3/2000 |
| EP | 0984409 | A2 | 3/2000 |
| GB | 2 201 821 | A | 9/1987 |
| WO | WO 97/32285 | | 9/1997 |
| WO | WO 00/12186 | | 3/2000 |
| WO | WO 00/66235 | | 11/2000 |
| WO | WO 00/76606 | A1 | 12/2000 |
| WO | WO2004012159 | | 2/2004 |
| WO | WO 2004/025584 | A2 | 3/2004 |
| WO | WO 2005/099425 | | 10/2005 |

OTHER PUBLICATIONS

Ghost Hunter Advertisement written by Atronic, published in 2003.
Magic 8 Ball Advertisement written by IGT, published in 2003.
One page sheet showing and describing a 1977 Bally Monte Carlo game.
The Price is Right brochure written by IGT, published in 2001.
Slot City "Anchor Games Unveils 'City of Slots,'" Anchor Games published in 2001.
Slot Machines A Pictorial History of the First 100 Years, $5^{th}$ ed., written by Marshall Fey, published in 1983, p. 17.
Slots 2003, written by Melissa Raimondi, published in Jan. 2003.
Wheel & Deal Brochure written by Anchor Games, Strictly Slots, published in Dec. 2001.
Wheel of Fortune Advertisement written by IGT, 1999.
Wheel of Fortune Game Machine description by IGT, 1998.
Wheel of Fortune Video Slots Advertisement written by IGT, published in 2002.
Wheel Poker Brochure written by Anchor Games/Bally Gaming, Strictly Slots, was written prior to Sep. 12, 2002.
A Vamp for All Seasons Article (IGT), written by Strictly Slots, published in 2002.
Addams Family Article (IGT), written by Strictly Slots, published in 2000.
Battleship Advertisement, printed from www.mikohn.com, on Apr. 25, 2001.
Battleship Article (Mikohn), written by Strictly Slots, published in 2000.
Black Swan Paytable Display, written by IGT, published prior to 2001.
Boot Scootin Article, written by Strictly Slots, published prior to Jul. 2002.

Break the Spell Advertisement, written by Atonic Casino Technology, Ltd., published in 1999.
Break the Spell Article, written by Strictly Slots, published in Sep. 2000.
Break the Spell, printed from www.atronic.com on Jul. 15, 2001.
By George Advertisement, written by IGT, published in 2002.
Cash Chameleon Article, written by Strictly Slots, published in Apr. 2001.
Cash for Life—Offer Bonus Advertisement/Lotsa Loot Advertisement/Take It or Leave It Advertisement, written by Bally Gaming, published in 2002.
Cash for Life—Triple Spin Bonus Article (Bally Gaming), written by Strictly Slots, published in 2003.
Catch A Wave Advertisement, written by IGT, published in Dec. 2000.
Cossack Dance Advertisement, written by Olympic Video Gaming, published prior to 2002.
Deep Pockets Article (IGT), written by Strictly Slots, published in 2002.
Double Diamond Line Advertisement, written by Bally Gaming Systems, published in 2000.
Double Top Dollar Advertisement, written by IGT, published in 2003.
Enchanted Unicorn Advertisement, written by IGT, published in 2001.
Field Testing New Slots Article, written by Strictly Slots, published in Jul. 2000.
Fire and Fortune Article (Anchor Games), written by Strictly Slots, published in 2001.
Fishin' Buddies Article, written by Strictly Slots, published in Apr. 2001.
Fortune Cookie Advertisement, written by www.igt.com, printed Mar. 21, 2001.
Fortune Cookie Advertisement, written by IGT, published in 2000.
Happy Camper Advertisement, written by IGT, published in 2001.
Hollywood Advertisement, written by Shuffle Master Gaming, published in 2001.
Introducing the "Smiling Ape" Machine Advertisement (including Joker's Wild Poker description), written by IGT, published prior to 2001.
Jackpot Party Brochure and Articles, written by WMS Gaming, Inc, published in 1998.
Joker's Wild Advertisement, written by IGT, published prior to 2001.
King Cash Slots Advertisement, written by IGT, published in 2003.
Let's Make A Deal Advertisements, written by Bally Gaming/Shuffle Master Gaming, published in 2001.
Little Green Men, Jr. Advertisement, written by A.C. Coin, published prior to 2002.
Loco Loot Article, written by Strictly Slots, published in May 2002.
Mountain Money Article, written by Strictly Slots, published in Jun. 2002.
On the House Advertisement, written by Olympic Video Gaming, published prior to 2002.
Penguin Pays Advertisement, written by Aristocrat Incorporated, published in 1998.
Press Your Luck Article (Shuffle Master Gaming), written by Strictly Slots, published in 2000.
Price is Right—Cliff Hangers Description, printed from www.geocities.com on Mar. 21, 2001.
Price is Right—Cliff Hangers Advertisement, written by IGT, published in 2001.
Price is Right—Showcases Description, printed from schuminweb.com on Mar. 16, 2001.
Psycho Cash Beast Advertisement, written by IGT, published in 1999.
Reel Magic™ Gaming Machine Description, written by IGT, gaming machine available in 1986.
Symbol Feature Description in Australian UFO Gaming Machine, written by IGT, gaming machine available 1995.
Take Your Pick Advertisement, written by IGT/Anchor Gaming, published in 1999.
Take Your Pick Article (IGT), written by Strictly Slots, published in 2001.
The Latest Buzz Article, written by Bally Gaming Systems, published in Fall 2000.
Three Wishes Article (Atronic Americas), written by Strictly Slots, published in 2000.
Top Dollar Game Advertisement, written by IGT, published in 1998.
Wild Bear Salmon Run Advertisement written by IGT, published in 2003.
Wild Streak Article, written by Strictly Slots, published in 2001.
Your Real Key to Gaming Success Advertisement (including Roll Over Beethoven and Wild Fortune), written by Olympic Video Gaming, published prior to 2005.

* cited by examiner

GAMING DEVICE HAVING A MULTIPLE COORDINATE AWARD DISTRIBUTOR

CROSS-REFERENCE TO RELATED APPLICATIONS

This application is related to the following commonly-owned co-pending patent applications: "GAMING DEVICE HAVING A MASKED AWARD GAME," Ser. No. 10/210,540; and "GAMING DEVICE HAVING AN OFFER AND ACCEPTANCE GAME," Ser. No. 11/122,719.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming device manufacturers strive to make gaming devices that provide as much enjoyment and excitement as possible. Providing a secondary or bonus game in which a player has an opportunity to win potentially large awards or credits in addition to the awards associated with the primary or base game of the gaming device is one way to enhance player enjoyment and excitement.

Gaming devices having bonus games generally employ a triggering event that occurs during the base game operation of the gaming device. The triggering event temporarily stalls or halts the base game play and enables a player to enter a second, different game, which is the bonus game. The player plays the bonus game, likely receives an award, and returns to the base game.

One known bonus game is in the "WHEEL OF FORTUNE" gaming device manufactured by the assignee of this application. In this game, a multi-colored award wheel is attached to the housing of the gaming device. The award wheel is divided into several sections. Each section includes an award that ranges in value from twenty to one thousand. In this game, a player plays a base game that includes spinning reels and a central payline. When the wheel symbol is positioned along the central payline on the third reel, the player enters the bonus game.

In the bonus game, the player obtains one opportunity or spin of the award wheel. The player causes the award wheel to spin by pressing a button on the gaming device. Once the award wheel starts spinning, the player waits until it stops. An indicator located at the top of the award wheel points to a section of the wheel. The player receives the award on that section for the bonus game. After the player receives that award, the bonus game ends and the player can resume playing the base game.

Another known game is described in U.S. Pat. No. 6,059,658 to Mangano et al. This patent relates to a spinning award wheel game. The game includes a display having five concentrically arranged wheels. Each wheel has indicia designated with an Ace, King, Queen, Jack, Ten and a wild symbol along the outer edge of the circles. Once a player enters the game, the player initiates the spinning of the wheels. Each wheel rotates independently of the other wheels. The object of the game is to align winning combinations of indicia, which in this game are winning hands in poker. A indicator points to a sequence of five indicia formed from each of the five rotating wheels. If the sequence equals a winning combination, the player receives an award.

To increase player enjoyment and excitement, therefore, it is desirable to provide new bonus games having award wheels that provide larger awards to players with minimal risk.

SUMMARY OF THE INVENTION

The present invention provides a gaming device and in particular a bonus game of a gaming device that enables players to accumulate awards by obtaining sections on an award distributor such as an award wheel based on the coordinates of the sections.

In one embodiment, the award wheel includes several annular areas or groups that are each divided into a plurality of sections. The sections are each defined by first and second coordinates on the award wheel and include award symbols that are associated with awards. The coordinates define the location of each section on the award wheel. Initially, the gaming device alternately illuminates each annular area, which defines the first coordinate of the groups of sections in the annular areas. In one embodiment, the gaming device picks one of the annular areas. In another embodiment, the gaming device enables the player to pick one of the annular areas where the awards associated with the annular areas are approximately equal. Once the first coordinate is defined by selecting one of the annular areas on the award wheel, the gaming device or player activates or spins the award wheel. When the wheel stops spinning, a section indicator indicates a second coordinate which together with the first coordinate, defines the determined section in the annular area. The player receives the award associated with the section that is defined by the indicated first and second coordinates. In one embodiment, the player continues to play the bonus game until the player is out of activations or spins of the award wheel.

In one preferred embodiment, the award wheel is divided into several groups or annular areas where each of the annular areas is further divided into seven sections. The first coordinate of a group of sections is represented by the radial distance from the center of the award wheel to the annular area. The second coordinate of one of the sections in the group is defined by the angular location of a section along the annular area. Each section includes a symbol such as an award symbol. A plurality of awards are associated with the award symbols. In one embodiment, the awards associated with the sections in the innermost annular areas of the award wheel are substantially lower awards than the awards associated with the sections located in the outermost annular areas of the wheel. Each annular area is alternately highlighted or illuminated at the start of the bonus game by an illumination device. The annular areas alternately light up, one at a time, until only one area is randomly selected and remains illuminated. In one embodiment, the gaming device (i.e., the processor) determines the indicated annular area. In another embodiment, the gaming device enables the player to pick the annular area as described above. Next, the gaming device or player activates or spins the award wheel. Once the wheel stops spinning, the section indicator indicates one of the sections in the indicated or highlighted annular area. The player receives the award associated with the indicated section. The player continues to play the bonus game until the player has no spins remaining in the game.

In another embodiment, the award wheel first is spun to indicate a pie-shaped area of the wheel. Each pie-shaped section is further divided into individual sections by the annular areas on the wheels. Then, the sections in the indicated pie-shaped area are alternately illuminated until one section is randomly selected and remains illuminated. The player receives the award associated with that selected section.

In a further embodiment, an annular area is illuminated and defines the first coordinate of a group of sections. Then the indicator spins about the perimeter of the award wheel to define the second coordinate of one of the sections in the illuminated annular area. When the indicator stops, the indicated first and second coordinates define the indicated section on the award wheel. The gaming devices provides the player with the award associated with the indicated section defined by the determined first and second coordinates.

Although the present invention is discussed relative to a bonus game of a gaming machine, it should be appreciated that the present invention could be employed as a primary game in a gaming device.

It is therefore an advantage of the present invention to provide a gaming device having a multi-coordinate wheel with an alternating bonus award where awards are associated with multi-coordinate locations on an award wheel.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
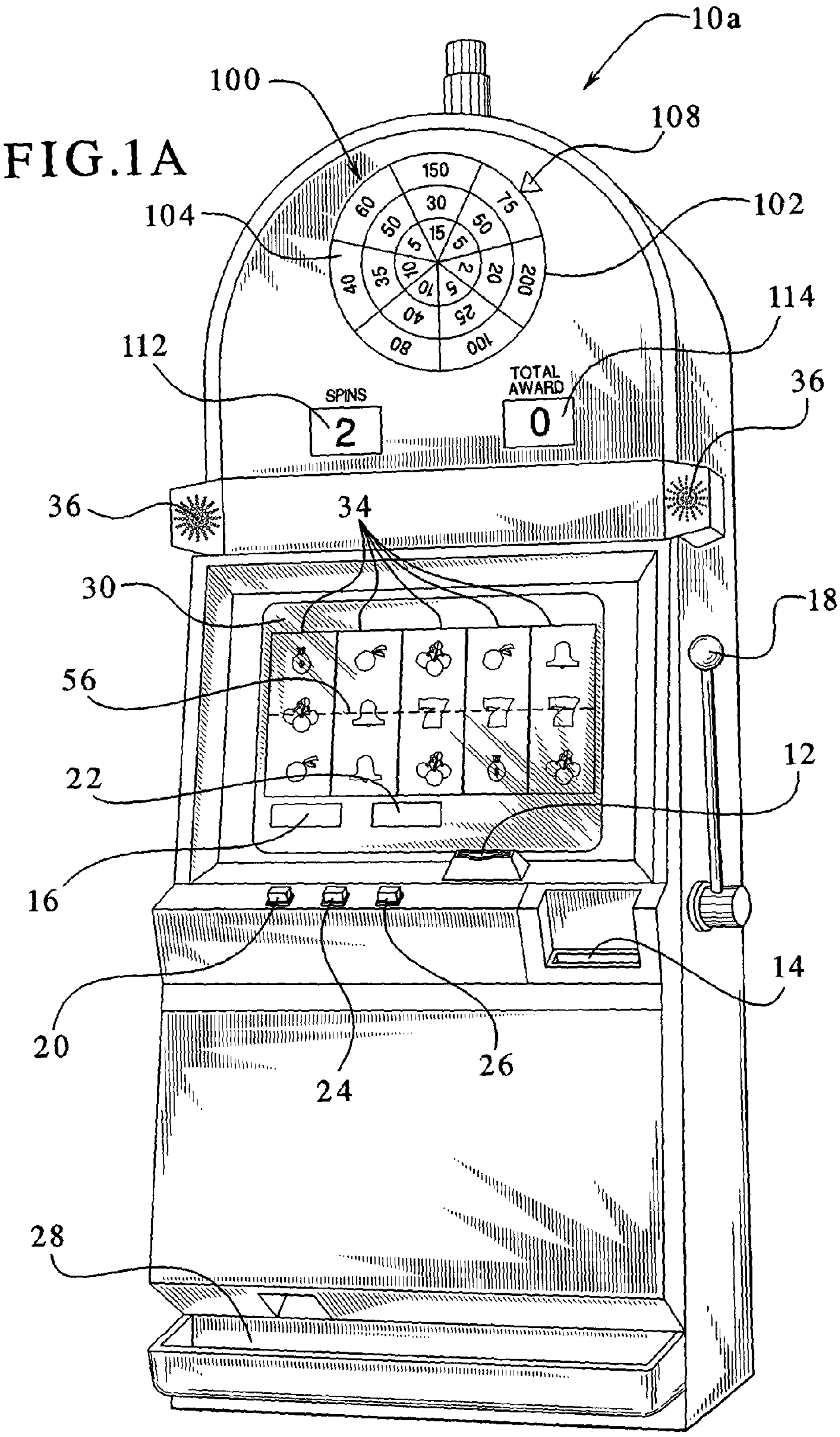
FIG. 1A is a front perspective view of one embodiment of the gaming device of the present invention which includes a mechanical multi-coordinate award wheel.
Figure 1B:
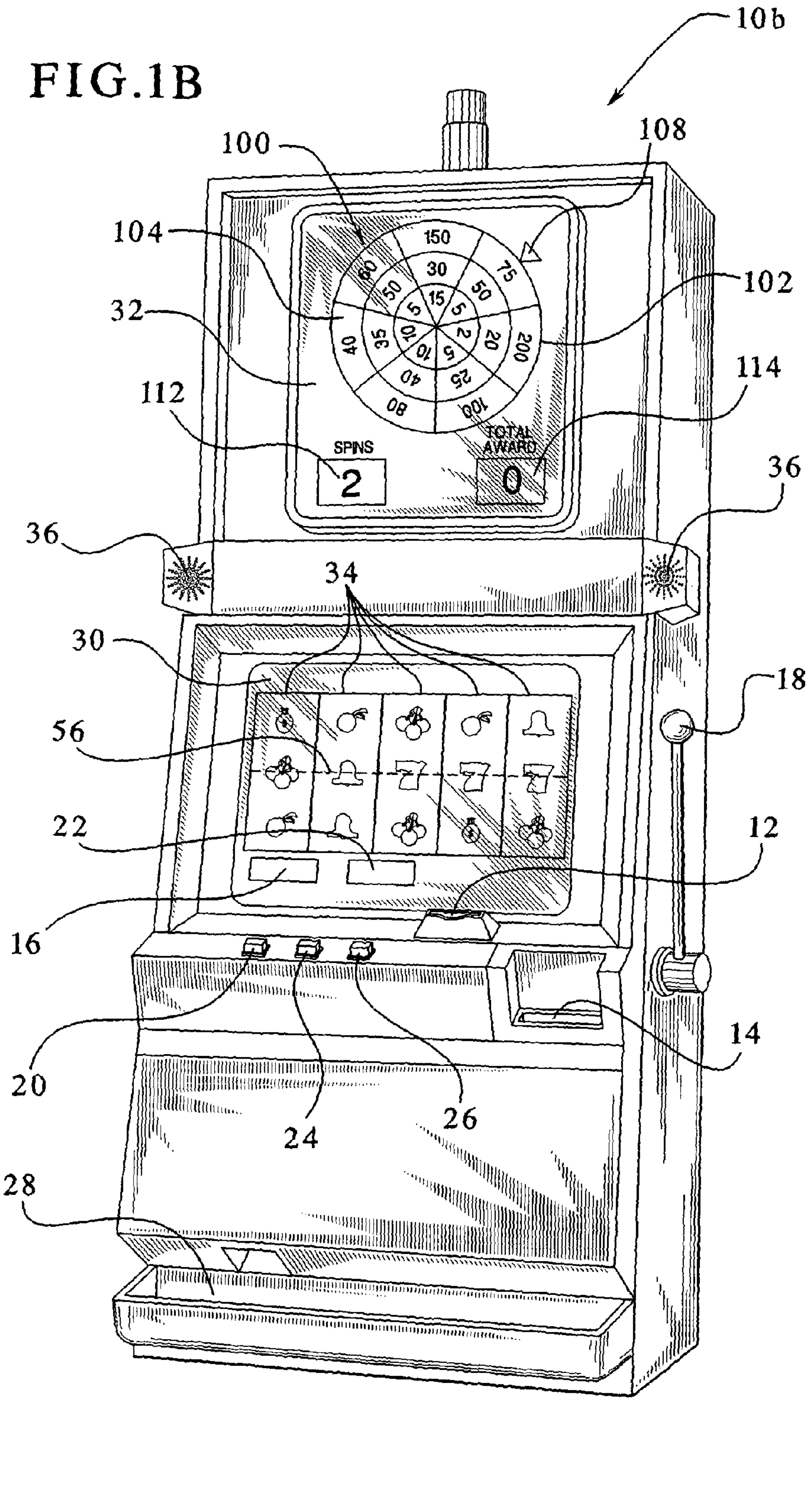
FIG. 1B is a front perspective view of another embodiment of the gaming device of the present invention which includes a multi-coordinate award wheel in a video format.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, black jack, poker or keno, any of the bonus triggering events and any of the bonus round games. The symbols and indicia used on and in gaming device 10 may be in mechanical, electrical, electronic or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30 and a mechanical multi-coordinate award wheel 100 that physically spins in front of a player. The award wheel is divided into a plurality of annular areas 102 that are further divided into sections 104 where each section is indicated by a section indicator 108. The alternative embodiment shown in FIG. 1B includes a central display device 30 as well as an upper display device 32. The upper display device 32 displays the multi-coordinate award wheel 100 of the present invention in a video format.

Gaming device 10 in one embodiment preferably displays a plurality of reels 34 such preferably three to five reels 34 in mechanical or video form, on one or more of the display devices. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
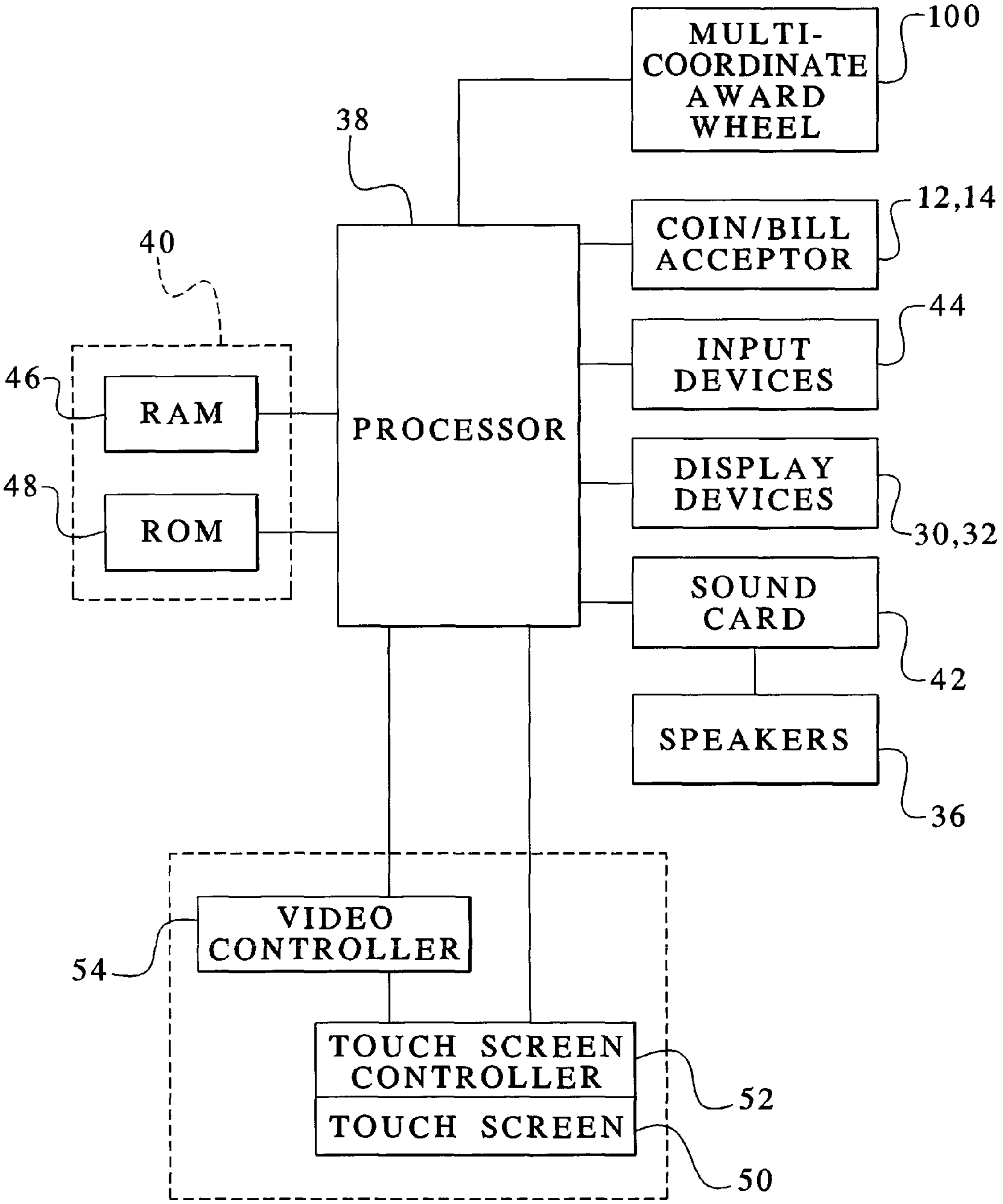
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; one or more input devices 44; and an optional mechanical multi-coordinate award wheel 100. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on one or more of a plurality of the reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Bonus Game

Figure 3:
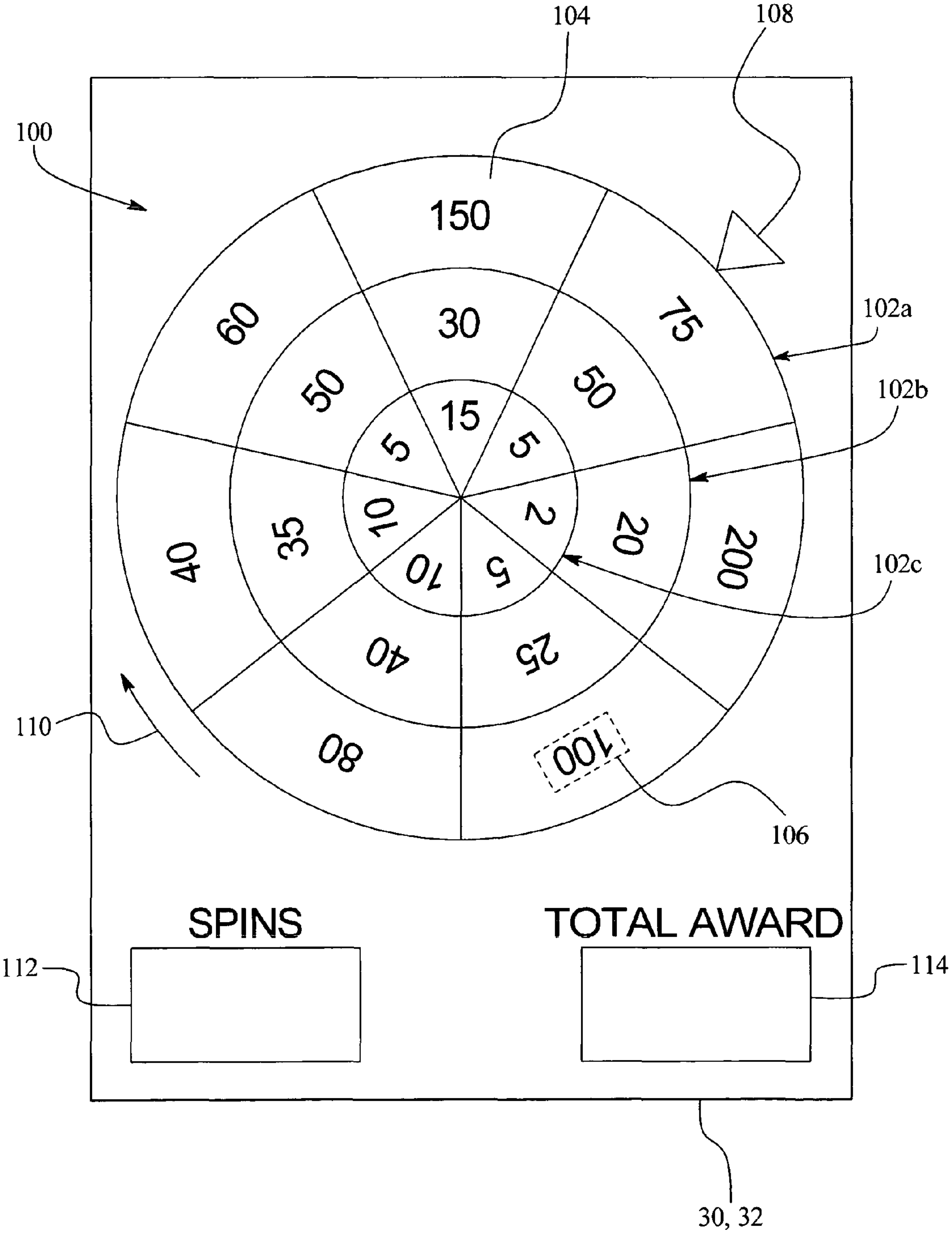
FIG. 3 is an enlarged elevation view of a display device illustrating one embodiment of the present invention.

Referring to FIG. 3, the gaming device 10 includes an award distributor such as a multi-coordinate award wheel 100. In one embodiment, the award wheel 100 is displayed on a video display device such as display device 32 in FIG. 1B. In another embodiment, the award wheel is a mechanical wheel that is physically attached to the gaming device. The award wheel 100 is divided into multiple annular areas 102 where any suitable number of annular areas may be employed by the game implementor. Each annular area 102 is divided into a plurality of sections 104. An award 106 or award symbol is associated with each section 104. In one embodiment, a bonus number of credits is associated with each award symbol. However, it should be appreciated that an award does not have to be associated with each section and that a multiplier, zero award, negative award or other type of modifier may be associated with one or more awards or award symbols on the award wheel.

In operation, the multi-coordinate award wheel alternately illuminates the annular areas 102*a* to 102*c*. In one embodiment, the gaming device randomly stops on one annular area 102. In another embodiment, a player presses a button or similar input to select an annular area. Once a annular area is determined or selected, the award wheel spins or rotates in a clockwise direction as shown by arrow 110 to indicate a section 104. It should be appreciated that the award wheel can also spin in a counter-clockwise direction if desired. It should also be appreciated that the award wheel and sections thereof may be different shapes and sizes.

A section indicator 108 is positioned adjacent to the outer edge of the award wheel 100. The indicator 108 indicates or points to one of the sections 104 of the award wheel. In FIG. 3, the section indicator 108 is an arrow-shaped component that is positioned along the outer edge of the award wheel 100. It should be appreciated that the section indicator may also include an illumination device that lights up or highlights a section 104 similar to how the annular sections 102 are highlighted. An illumination device may be associated with each section or with all of the sections. It should also be appreciated that the award wheel may be stationary and the indicator may move around the perimeter of the wheel. Alternatively, both the award wheel and the indicator may move at different rates, or in different directions or at different rates in different directions.

The gaming device preferably includes a spin remaining display 112 and a total award display 114. The spin remaining display 112 indicates the number of spins that are remaining in a game. The total award display 114 indicates the value of the bonus awards that the player has accumulated during the bonus game. When the player runs out of spins, the bonus award identified in the total award display 114 is transferred to the player's credit display in a conventional manner.

Referring now to FIGS. 4A through 4F, an example of one embodiment of the present invention is illustrated where the gaming device provides a player with three spins to start the bonus game. In this example, the multi-coordinate award wheel 100 has three annular areas 102*a*, 102*b*, 102*c*, and several sections 104 that include awards 106.

Figure 4A:
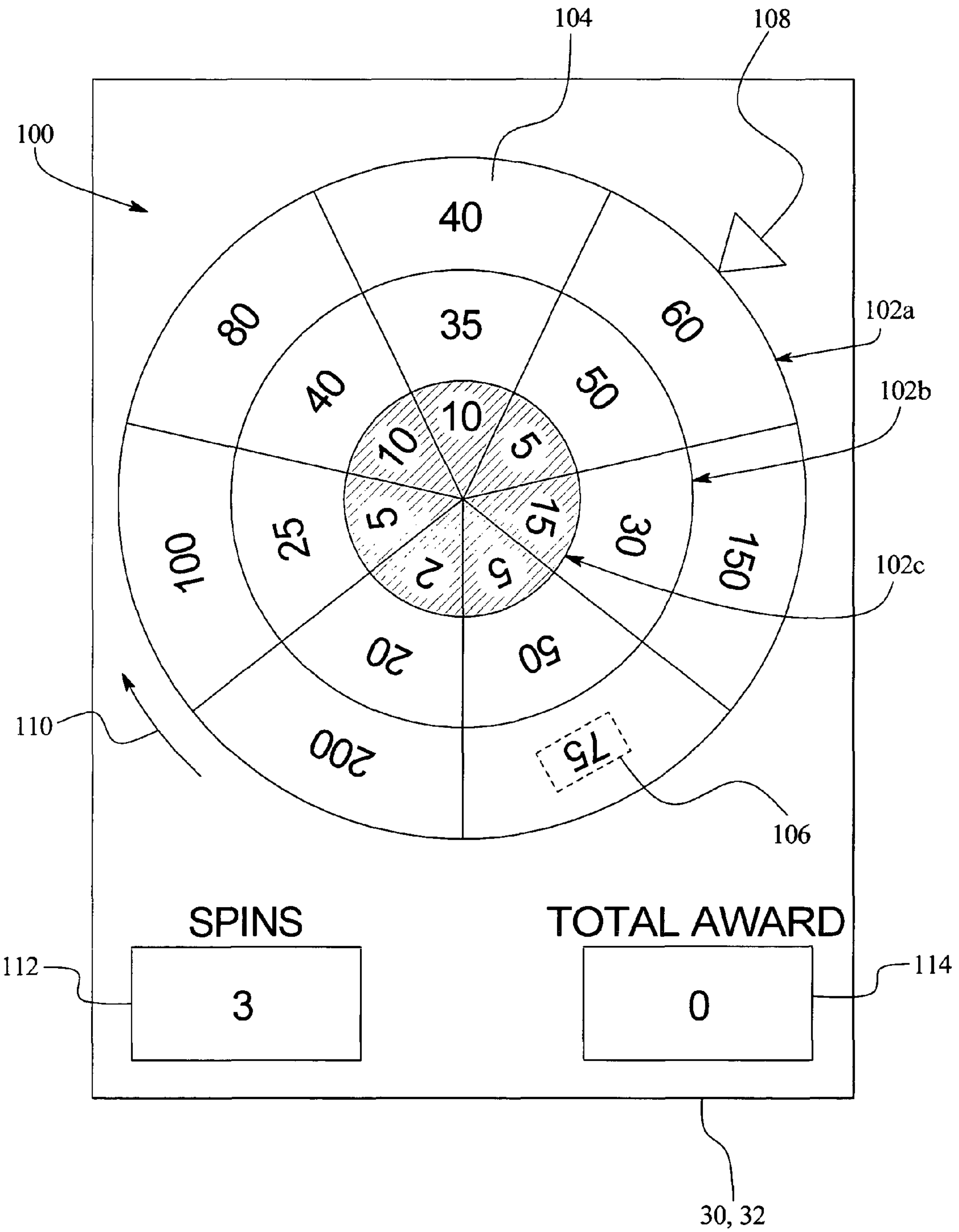
FIGS. 4A, 4B, 4C, 4D, 4E and 4F are enlarged elevation views of a display device of the present invention illustrating three spins of the multi-coordinate award wheel in the bonus game.

Referring to FIG. 4A, the gaming device displays several sections 104 on an award wheel 100, where each section has a coordinate location on the award wheel 100. In this example, the coordinate location of each section is defined by a radial coordinate and an angular coordinate. The radial coordinate defines a sections' radial distance from the center of the award wheel or the annular area 102 that contains the section. The angular coordinate defines the location of the section along the perimeter of the award wheel. It should be appreciated that the coordinates of a section may be predefined or randomly determined by the processor. It should also be appreciated that the coordinates may be any coordinates defined by the game implementor.

At the start of the bonus game, the gaming device alternately illuminates the annular areas 102*a* to 102*c*. The areas illuminate one at a time where area 102*a* illuminates first, followed by area 102*b* and 102*c*. The gaming device repeats this sequence until a radial coordinate or annular area 102 is determined. It should be appreciated that the areas 102 may illuminate in any order or sequence desired by the game implementor. The gaming device stops alternately illuminating the areas after determining the radial coordinate of a section. In another embodiment, a player input determines the radial coordinate.

After the radial coordinate is identified or indicated, the gaming device spins the award wheel 100 to determine the angular coordinate of the award section. It should be appreciated that the player may physically spin the award wheel 100 to determine the angular coordinate of the award section. The gaming device spins the award wheel 100 in a clockwise direction as shown by arrow 110. After the award wheel 100 stops spinning, the section indicator 108 indicates a section 104, which is defined by the radial coordinate and the angular coordinate of the section. The gaming device provides an award 106 associated with the indicated section 104. The award is transferred to the total award display 114 and the gaming device or player spins the award wheel 100 again if the player has picks remaining in the game as indicated by pick display 112.

Figure 4B:
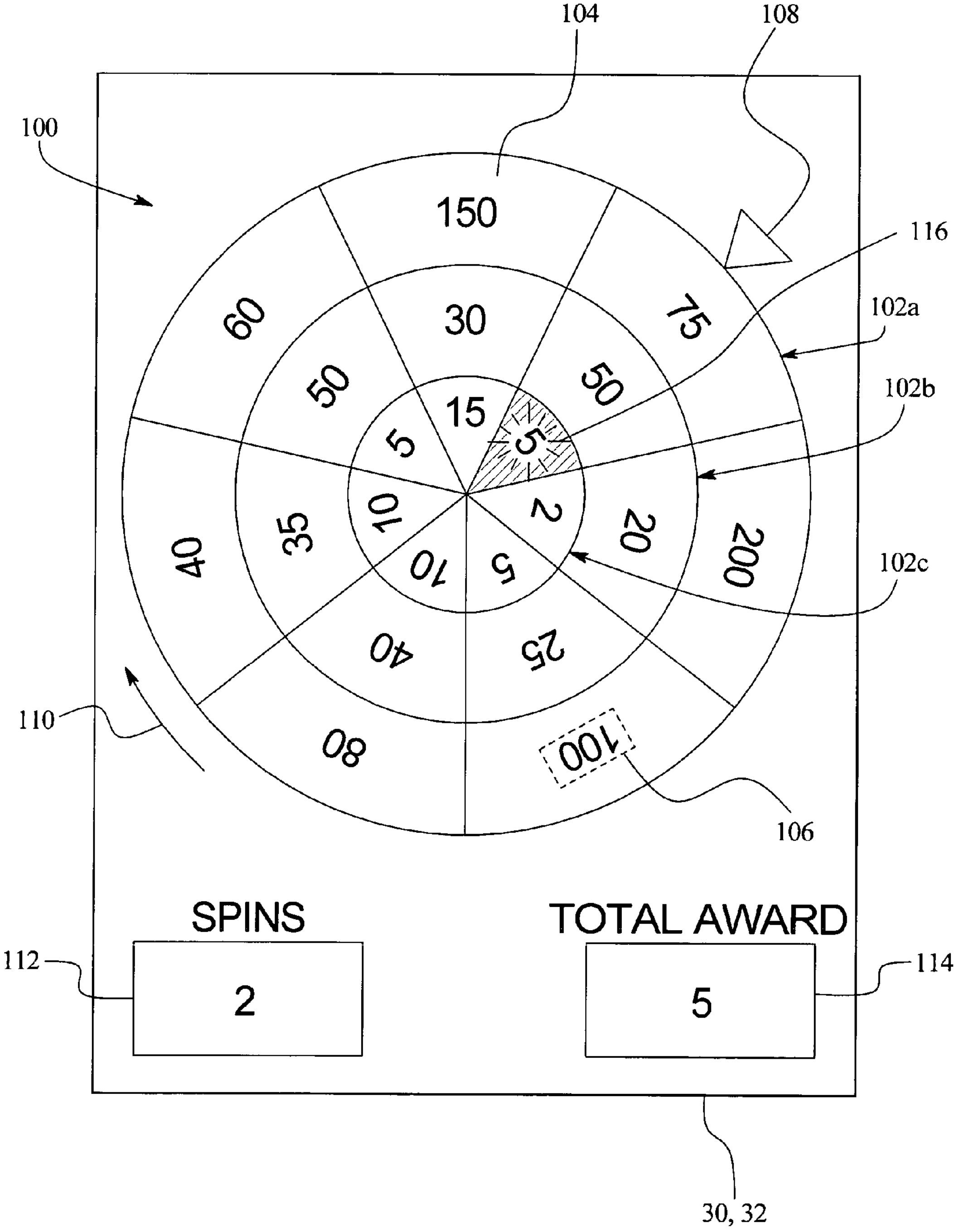

In FIG. 4A, the gaming device alternately illuminates the annular areas 102, and stops on annular area 102*c* or the innermost annular area of the multi-coordinate award wheel 100. Referring to FIG. 4B, the gaming device spins the award wheel in a clockwise direction to determine the angular coordinate of a section included in the annular area 102*c*. The section indicator 108 indicates section 116 in annular area 102*c*. An award of five is associated with section 116 and this award is transferred to the total award display as indicated by display 114. The player has two spins remaining in the bonus game.

Figure 4C:
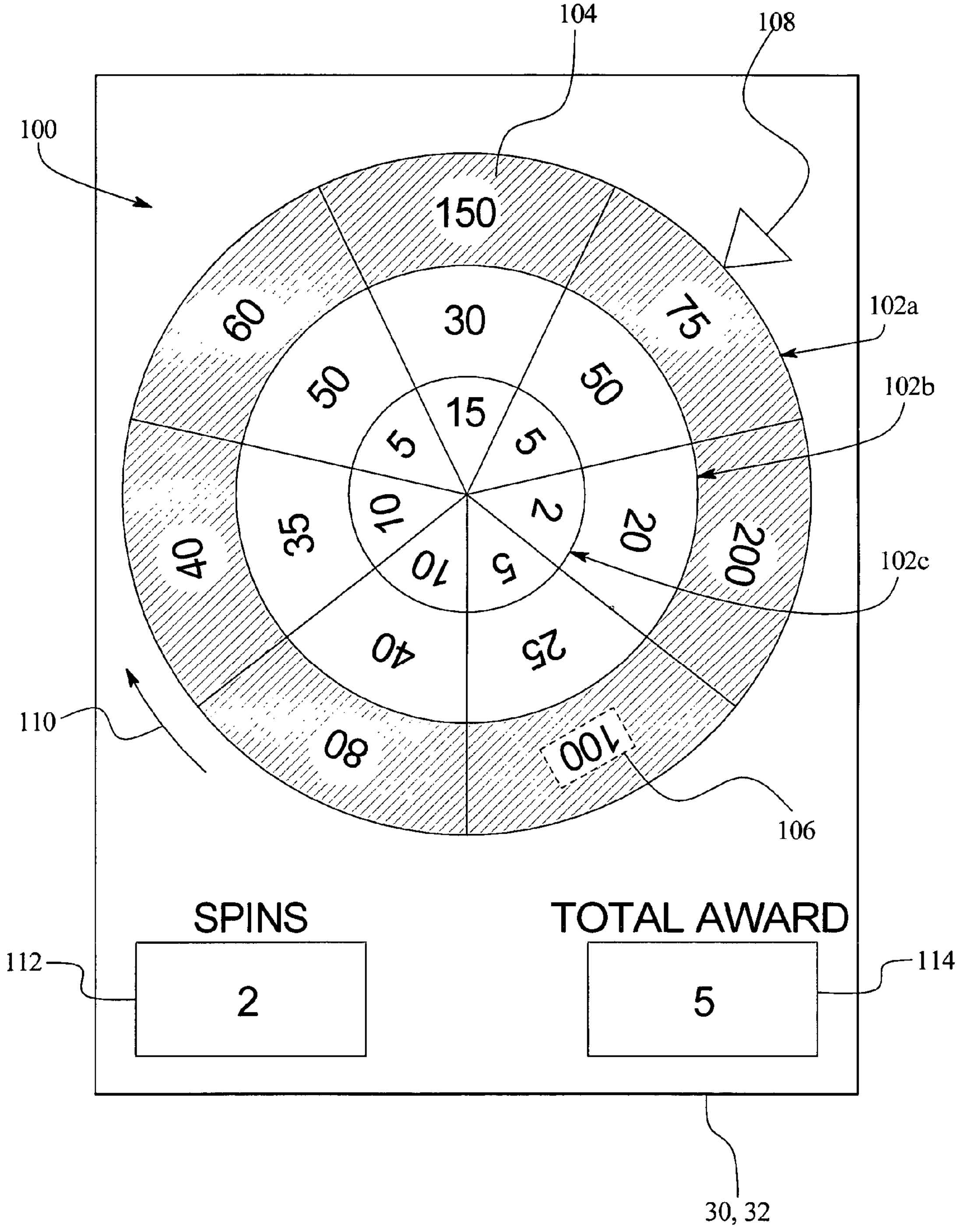
Figure 4D:
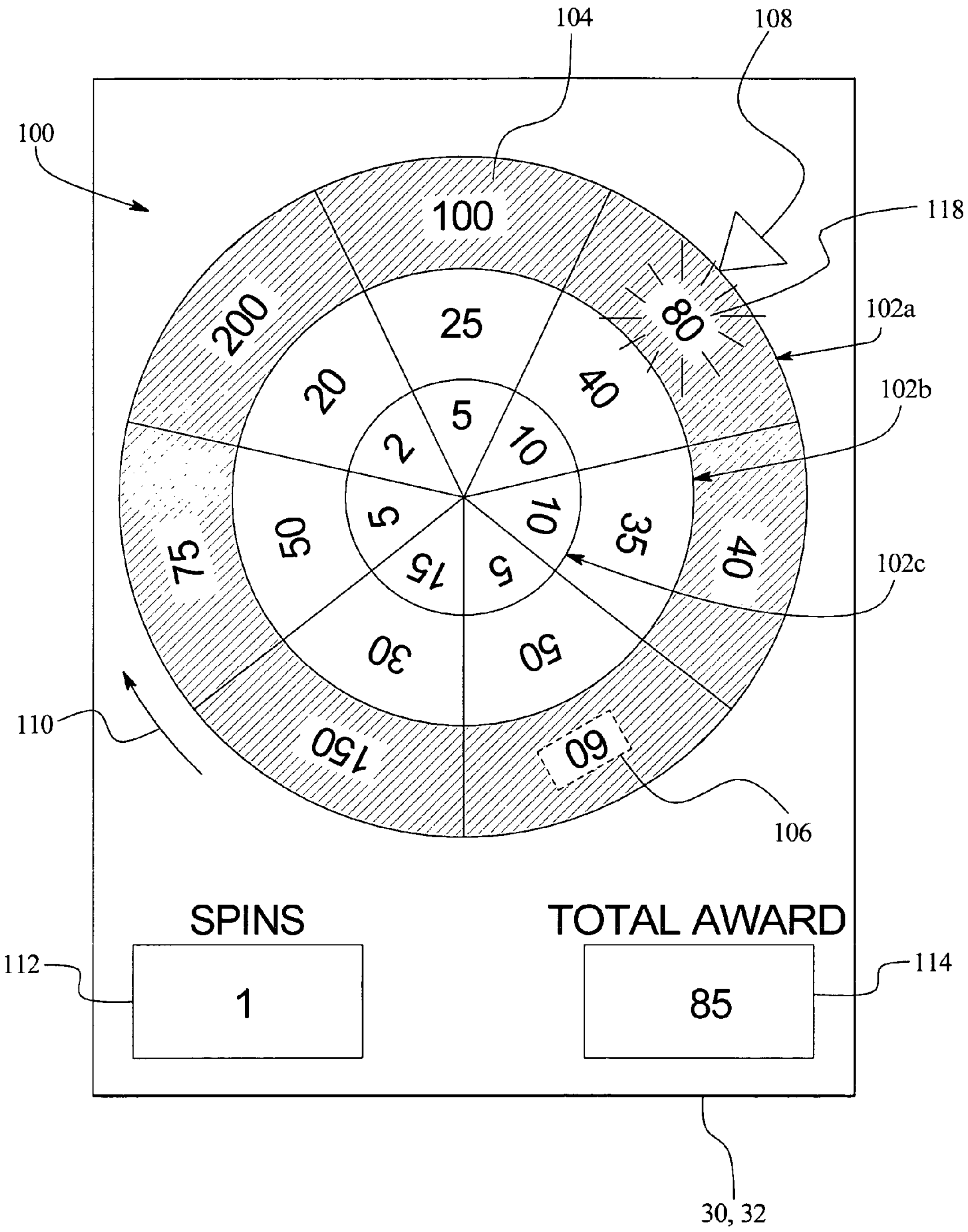

Referring now to FIG. 4C, the gaming device alternately illuminates the annular areas 102*a*, 102*b* and 102*c* again. A radial coordinate or annular area 102 is determined by the gaming device, which is annular area 102*a*. Annular area 102*a* remains illuminated while the gaming device spins the award wheel 100. In FIG. 4D, the award wheel stops spinning and the section indicator 108 indicates a section in the annular area 102*a*. Section 118 is indicated by the indicator and the player receives an award of eighty associated with that section 118. The award, eighty, is transferred and added to the award indicated by the total award display 114 to give the player a new total award of eighty-five. The player has one spin remaining in the bonus game as indicated by pick display 112.

Figure 4E:
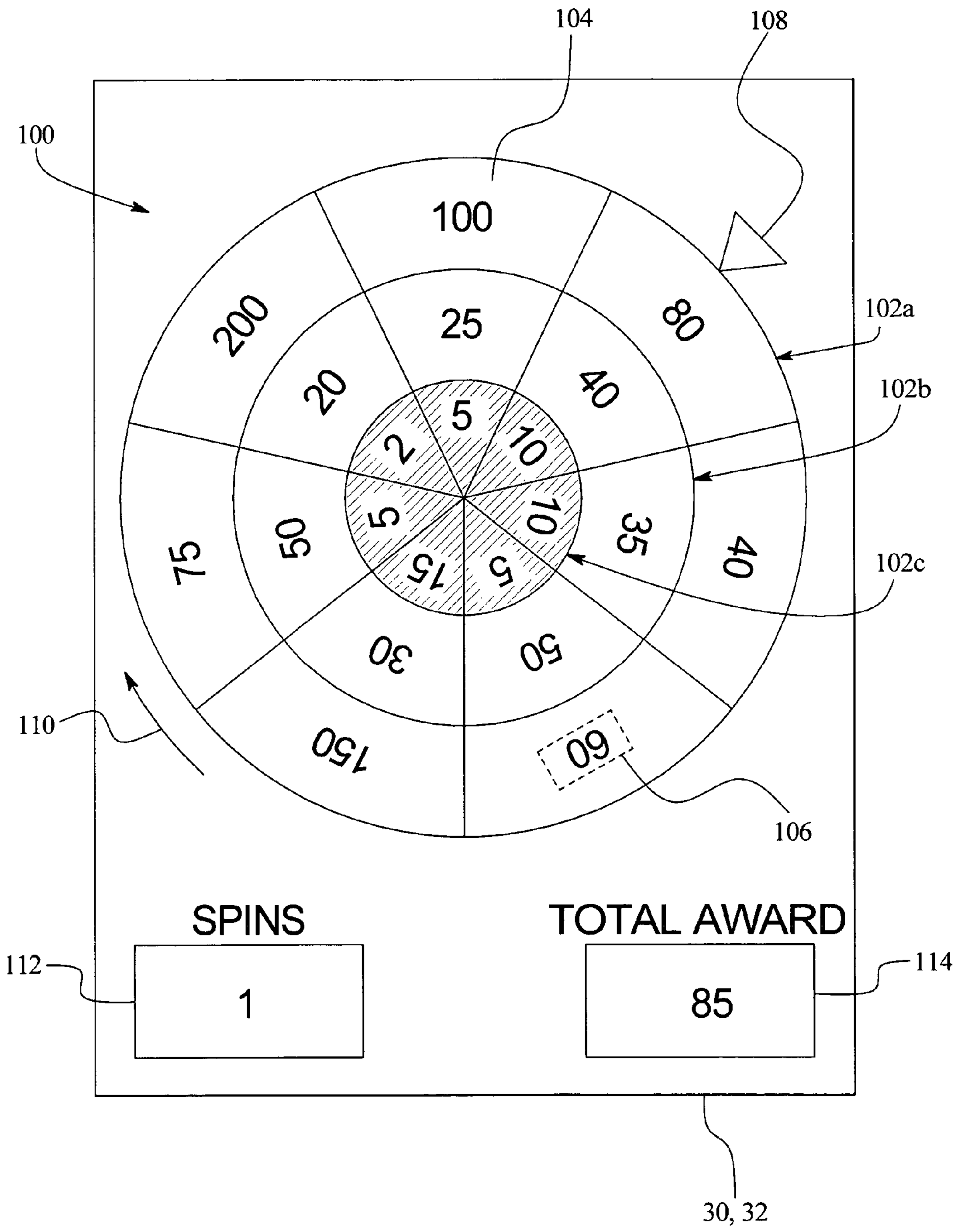
Figure 4F:
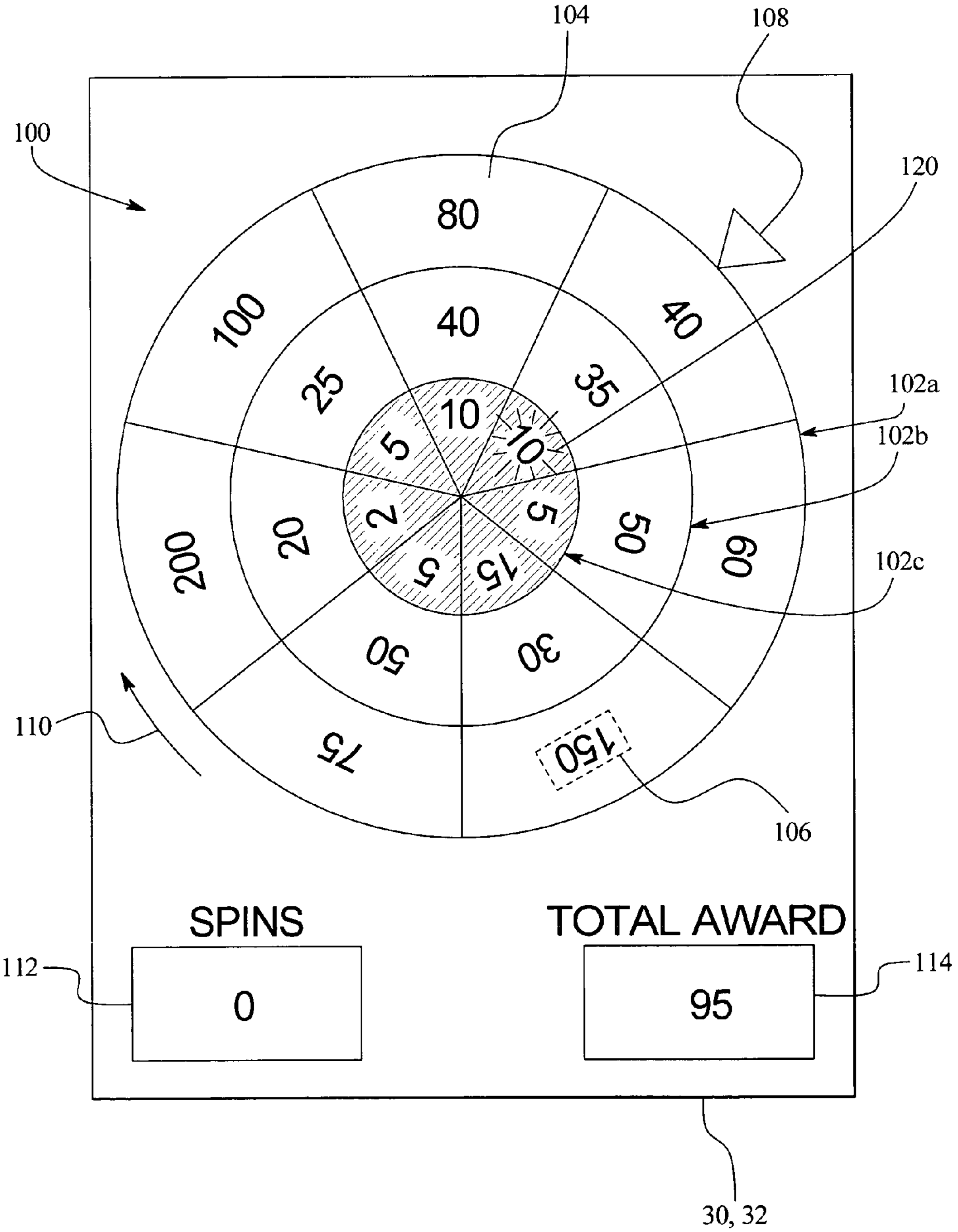

Referring now to FIG. 4E, the gaming device alternately illuminates the annular areas 102 until selecting area 102*c*. Annular area 102*c* remains illuminated and the gaming device spins the award wheel 100. In FIG. 4F, once the award wheel stops, the section indicator 108 indicates section 120. An award of ten associated with section 120 is transferred and added to the total award displayed in the total award display 114. The new total award equals ninety-five as indicated by the total award display 114. The player does not have any spins remaining as indicated by spin display 112 and therefore, the bonus game ends.

Figure 5:
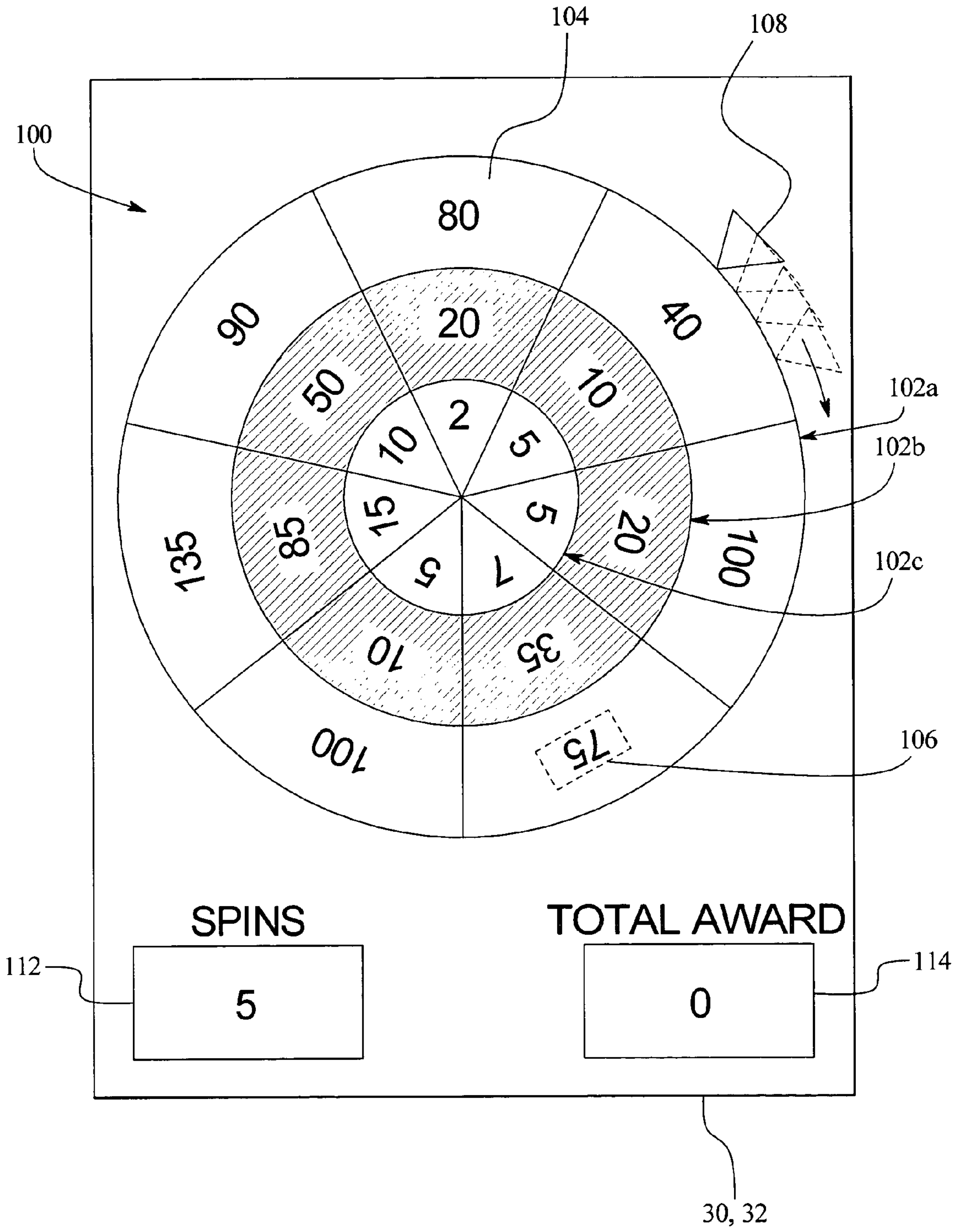
FIG. 5 is an enlarged elevation view of another embodiment of the present invention where the section indicator moves about the perimeter of the multi-coordinate award wheel.

Referring now to FIG. 5, another embodiment of the present invention is illustrated where the multi-coordinate award wheel is stationary and the section indicator 108 moves in a clockwise direction along the perimeter of the award wheel. In this embodiment, the section indicator 108 may move in a clockwise or counter clockwise direction to indicate a section 104.

Figure 6:
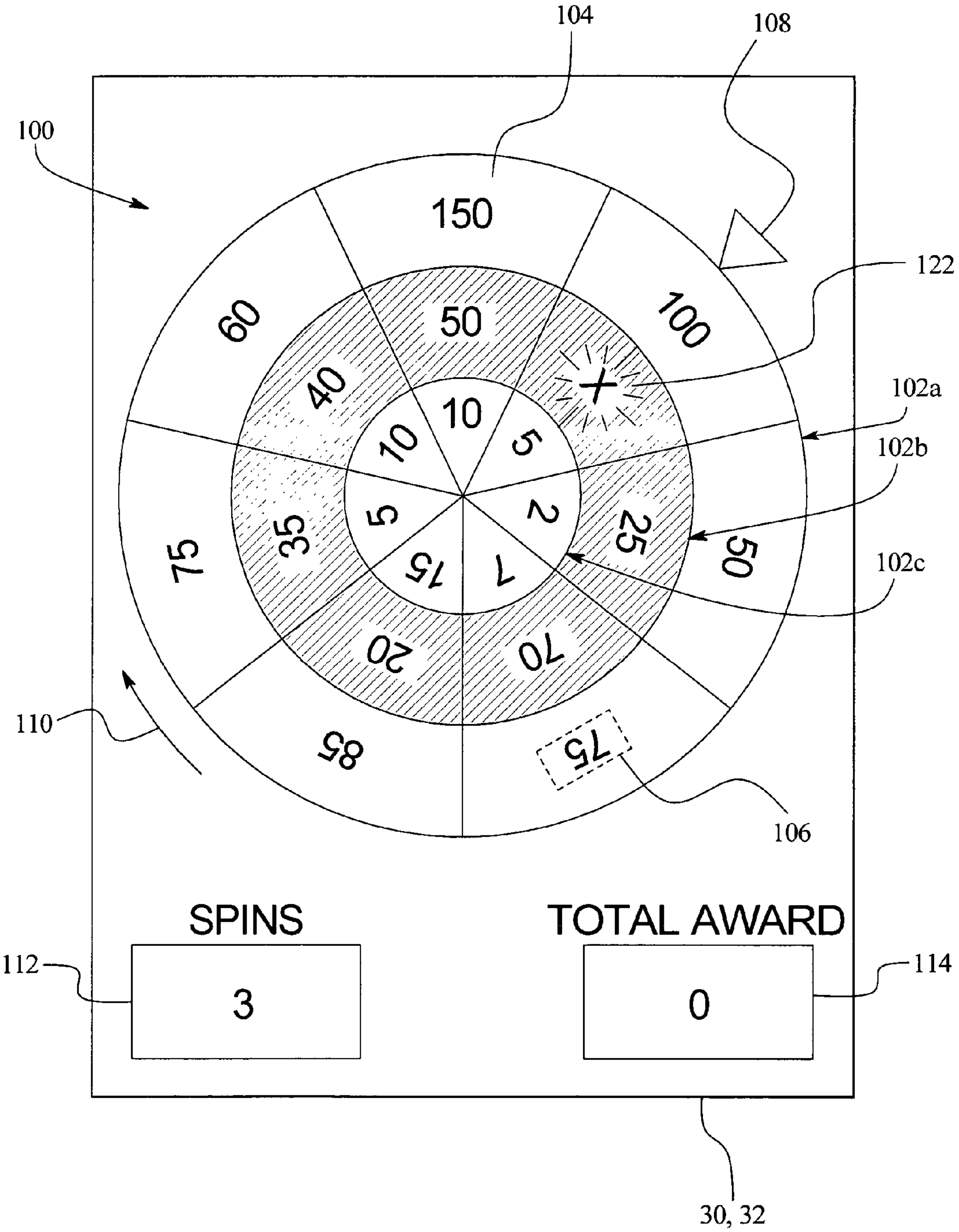
FIG. 6 is an enlarged elevation view of a further embodiment of the present invention where the multi-coordinate award wheel includes a terminator.

Referring to FIG. 6, another embodiment of the present invention includes one or more terminators 122, where the terminator is represented by the letter "X." If a player obtains a section associated with a terminator, the bonus game ends regardless of how many spins remain in the game. In this embodiment, the player attempts to obtain as many awards as possible before obtaining a terminator or running out of spins. It should be appreciated that a section including a terminator may be associated with a probability such that the coordinates of that section are more likely to be selected by the gaming device than the coordinates of a section associated with an award.

Because there are several different sections 104 including a plurality of awards 106 and one terminator 122, the coordinates are preferably associated with probabilities or weighted such that one coordinate is more likely to be indicated by the processor or indicator than another coordinate. In one embodiment, the coordinates are equally weighted or associated with equal probabilities. For example, if an award wheel has twenty-one sections, there are forty-two coordinates associated with those sections. A player, therefore, has a $1/42$ or approximately 2.38% chance of obtaining any one of the coordinates. Therefore in this embodiment, a player's chances of obtaining the coordinates associated with a particular award are equal to their chances of obtaining the coordinates of the terminator.

In another embodiment, the probabilities change after each spin of the award wheel. Coordinates on the award wheel start a bonus game having predetermined probabilities and then the probabilities change after each spin by a player. For example, assume that at the beginning of a bonus game the player has a 2.38% chance of obtaining any coordinate on an award wheel having twenty-one sections. After the player's first spin, the player receives an award. Now the processor alters the probabilities so that the player has a 5% chance of obtaining each coordinate associated with the terminator and a 2.25% chance of obtaining a coordinate associated with any other section on the wheel. Thereafter, the probabilities continue to change after each subsequent spin by the player. It should appreciated that the probability of obtaining the coordinates associated with the terminator may decrease and the probabilities of obtaining the coordinates associated with the awards may increase after a spin, or the awards and terminator may alternately increase and decrease after each spin or change according to whatever probability scheme is desired by the game implementor. It should also be appreciated that the coordinate probabilities may change after the first spin only and remain the same the rest of the bonus game or change after any number of spins desired.

In another embodiment, the coordinate probabilities change after a predetermined number of spins of the award wheel. In this embodiment, the implementor sets the probabilities to change after a certain number of spins so that a coordinate having a terminator is more likely or a coordinate associated with a section having a large award is less likely the further the player goes into a bonus game. By adjusting the coordinate probabilities in this manner, the game implementor limits the award amounts that the gaming device pays to players. It also limits the likelihood that a player will obtain the one substantially large award on a spin of the award wheel.

For example, assume that an award wheel has twenty sections and a player starts the bonus game with a 2.5% probability of obtaining each coordinate on the wheel. Before the fourth spin of the award wheel, the coordinate probabilities are programmed to change so that there is a 10% chance of obtaining each coordinate associated with the terminator and approximately a 2.11% chance of obtaining each coordinate associated with a section. Now the player is more likely to obtain a terminator with each subsequent spin than any single award associated with a section.

Similarly, a bonus game could be programmed to decrease the probability of obtaining coordinates associated with a large award section after a certain number of spins. Therefore, a player still has the possibility of obtaining the large award, but the probability is less. For example, an award wheel having twenty-one sections, including one terminator and one large award section, starts a bonus game where a player has an equal probability of approximately 2.38% of obtaining each coordinate on the award wheel. The gaming device is programmed to decrease the probability of obtaining each coordinate of the large award section after five spins to 0.25%. Therefore after five successful spins of the award wheel, the probability of obtaining each coordinate of the large award section decreases to 0.25% and the probabilities of obtaining any one of the other coordinates associated with the other sections increases to 2.49%.

In a further embodiment, total awards or award payouts in a bonus game are associated with probabilities. In this embodiment, the processor of the gaming device is programmed so that relatively larger awards are less likely than relatively smaller awards, or vice versa, in a bonus game. Therefore the game implementor controls the award amounts that are paid out by the gaming device without affecting the player's excitement and enjoyment of playing the game. For example, a processor is programmed to award values of zero through fifty in 60% of the bonus games, 51 through 100 in 30% of the bonus games and over 100 in only 10% of the bonus games in a particular gaming device. Based on the probabilities, the processor picks a total award value for the bonus game and subsequently determines the number of spins and the award amounts for each spin for the game. Thus, the total award is predetermined before the game ever starts, yet the player plays the bonus game as if the award is still to be determined.

In yet another embodiment, each section is associated with a probability such that one section is more likely to be indicated than another section on the award wheel. For example, sections including large value awards have a lower probability of being indicated by the indicator than sections including relatively lower valued awards.

In each of the above embodiments, the players always have an opportunity or chance to obtain each section on the award wheel whether the section includes a terminator or an award. Therefore, although the section probabilities may change in a bonus game, the players maintain their excitement and enjoyment of the bonus game.

Figure 7:
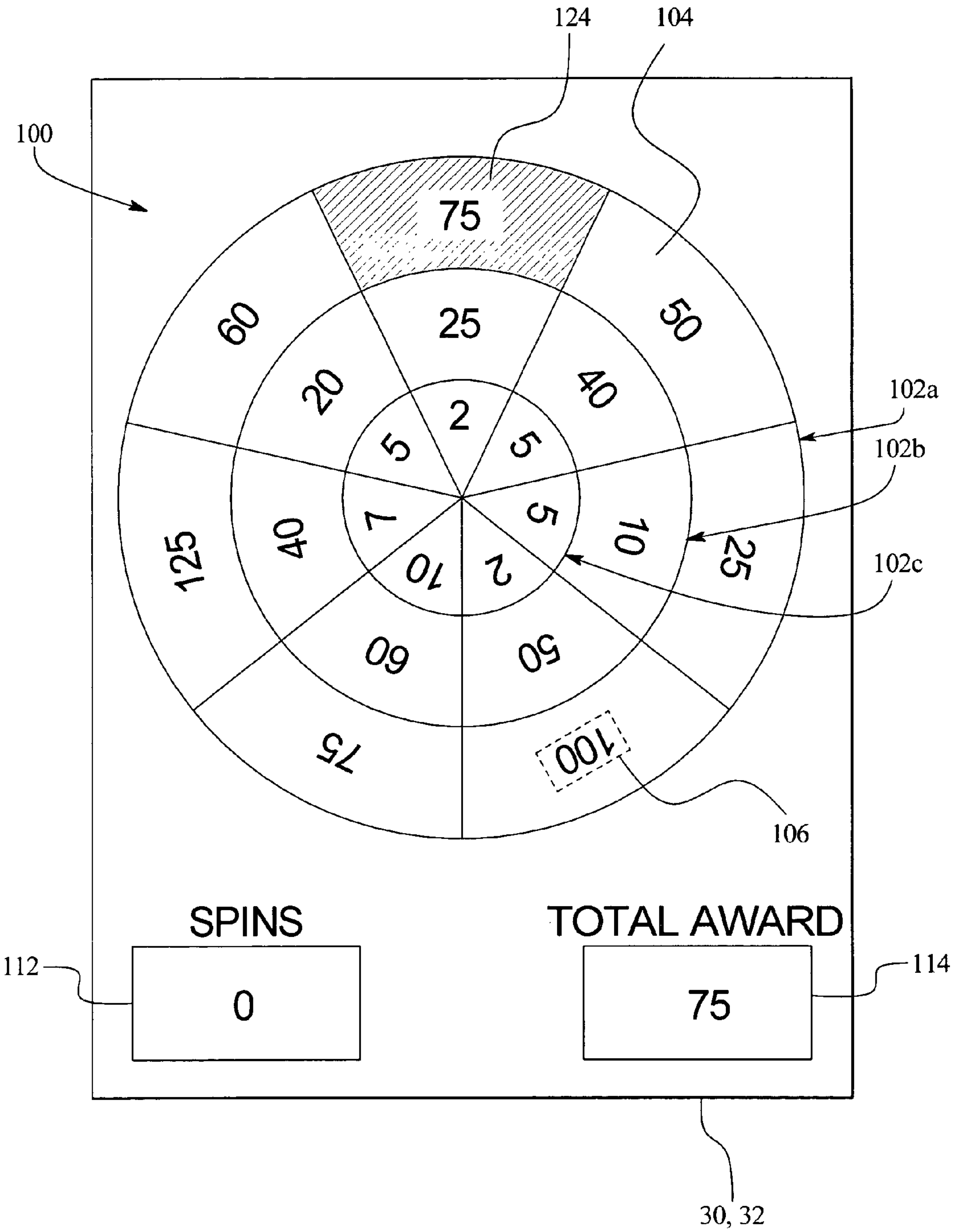
FIG. 7 is an enlarged elevation view of a further embodiment of the present invention where the multi-coordinate award wheel is stationary and the sections alternately illuminate to provide an award to the player.

Referring now to FIG. 7, a further embodiment of the present invention where the annular areas 102 are alternately illuminated until an area is selected by the gaming device. Then the sections 104 within the selected annular area 102 are alternately illuminated until a section is selected. For example, the annular area 102*a* was selected by the gaming device. Then the gaming device selected section 124 within annular area 102*a* as the section provided to the player. The player receives an award of seventy-five associated with section 124.

Figure 8:
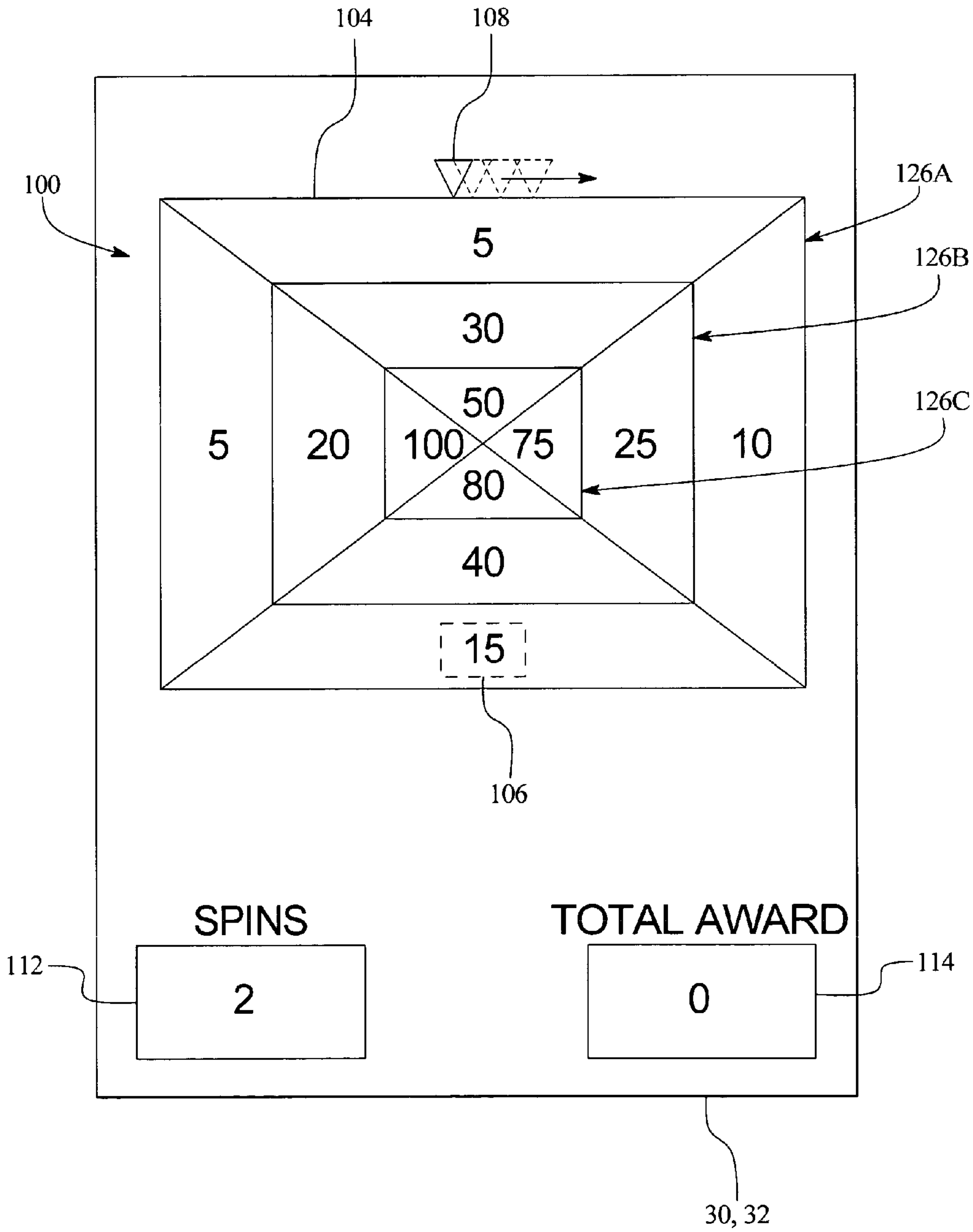
FIG. 8 is an enlarged elevation view of a further embodiment of the present invention where the sections are arranged in a square configuration.

Referring now to FIG. 8, another embodiment of the present invention is illustrated where the multi-coordinate award wheel 100 is a square. The award wheel 100 may be any shape or configuration as desired by the game implementor. In FIG. 8, the award wheel 100 includes square areas 126*a*, 126*b* and 126*c*. Each area is further divided into sections 104 that include awards 106. The sections each have an X coordinate and a Y-coordinate. An X,Y coordinate defines each of the sections displayed to the player. In operation, the gaming device alternately illuminates square areas 126*a* to 126*c* one at a time. The gaming device then picks one of the areas. Once an area 102 is picked, the section indicator 108 moves along the perimeter of the outside square 102*a* until a section is indicated. When the section indicator stops, a section 104 within the illuminated area 126 is determined. The award associated with this section is provided to the player and displayed in the total award display 114. The player continues to play the bonus game until the player runs out of spins in the bonus game.

In another embodiment of the present invention is illustrated where the award wheel sections 104 include an annular area 102 that has several low value awards, an annular area that has medium value awards and a annular area that has several high value awards. The probability of obtaining each low value award is preferably greater than the probability of obtaining the high value awards or the terminator. The award disparity creates enhanced levels of excitement for players because the player may obtain the large award. Additionally, the player is likely to obtain multiple spins in the bonus game because the probability of obtaining a low value award is higher than obtaining the terminator. Thus, each additional spin increases the players excitement and enjoyment of the game because each spin means an additional opportunity to obtain the large award. Even if the player does not obtain the large award, the player still obtains several awards in the bonus game and may accumulate a large award before obtaining a terminator.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:

at least one display device;

at least one processor; and at least one memory device which stores a plurality of instructions which, when executed by the at least one processor, cause the at least one processor to operate with the at least one display device to:

(a) display an award distributor associated with a game, said award distributor including an award wheel which includes:

(i) a plurality of sections displayed in a predetermined arrangement on said award distributor, said predetermined arrangement including each of the sections being in a set position relative to each other section of said award distributor, each of said sections defined by one of a plurality of first coordinates and one of a plurality of second coordinates, wherein:

(A) each first coordinate is associated with one of a first plurality of groups of the sections, each said group of the first plurality of groups including a plurality of the sections, and (B) each second coordinate is associated with one of a second plurality of groups of the sections, each said group of the second plurality of groups including a plurality of the sections, and (ii) a plurality of symbols, each of said symbols associated with one of a plurality of awards, wherein each of said plurality of sections of said award distributor is associated with one of said symbols;

(b) cause a display of said plurality of symbols and the awards associated with each of said symbols on the award distributor to a player upon initiation of a play of the game;

(c) cause a section indicator associated with the award distributor to indicate one of said plurality of sections of the award distributor by:

(i) determining one of the first coordinates, (ii) independently determining one of the second coordinates of one of the sections in the group of sections associated with the determined first coordinate, and (iii) causing the section indicator to indicate the section defined by the determined first and second coordinates; and (d) provide to the player the award associated with the symbol of the indicated section.

2. The gaming device of claim 1, which includes a probability of being determined associated with each of the first and second coordinates.

3. The gaming device of claim 2, wherein a plurality of the probabilities are the same.

4. The gaming device of claim 2, wherein all of the probabilities are the same.

5. The gaming device of claim 1, which includes a probability of being indicated by the section indicator associated with each of the sections, wherein the plurality of instructions, when executed by the at least one processor, cause the at least one processor to determine the first and second coordinates based on said probabilities.

6. The gaming device of claim 1, wherein one of the sections includes a terminator symbol.

7. The gaming device of claim 6, which includes a probability of being indicated by the section indicator associated with each of the sections, wherein the probability associated with the section including the terminator symbol is greater than the probabilities associated with a plurality of the other sections.

8. The gaming device of claim 6, which includes a probability of being indicated by the section indicator associated with each of the sections, wherein the probability associated with the section including the terminator symbol is greater than the probabilities associated with all of the other sections.

9. The gaming device of claim 1, wherein the awards include at least one of the awards selected from the group consisting of: a value, a modifier, a multiplier, a free activation, a free spin and a free game.

10. The gaming device of claim 1, which includes a probability of being indicated by the section indicator associated with each of the awards.

11. The gaming device of claim 1, which includes a plurality of potential total awards, and wherein the plurality of instructions, when executed by the at least one processor, cause the at least one processor to operate with the at least one display device to pick one of the total awards and repeatedly cause the section indicator to indicate sections of the award distributor until the awards associated with the symbols on the indicated sections accumulate to the total award.

12. The gaming device of claim 1, wherein the determinations of the first and second coordinates are each random.

13. The gaming device of claim 1, wherein the symbols are game elements.

14. The gaming device of claim 1, wherein the section indicator includes at least one illumination device configured to illuminate the sections of the award distributor.

15. The gaming device of claim 1, wherein the section indicator includes at least one illumination device associated with each of the sections, wherein the illumination devices are configured to illuminate the sections of the award distributor.

16. The gaming device of claim 1, wherein the section indicator includes a plurality of illumination devices which are configured to simultaneously illuminate a plurality of the sections of the award distributor.

17. The gaming device of claim 1, wherein the section indicator includes a plurality of illumination devices which are configured to alternately illuminate a plurality of the sections of the award distributor.

18. The gaming device of claim 1, wherein a plurality of the sections include a terminator symbol.

19. The gaming device of claim 18, which includes a probability of being indicated by the section indicator associated with each of the sections, wherein the probabilities associated with the sections including the terminator symbols are greater than the probabilities associated with a plurality of the other sections.

20. The gaming device of claim 18, which includes a probability of being indicated by the section indicator associated with each of the sections, wherein the probabilities associated with the sections including the terminator symbols are greater than the probabilities associated with all of the other sections.

21. The gaming device of claim 1, which includes a spin initiator, wherein the plurality of instructions, when executed by the at least one processor, cause the at least one processor to enable the player to utilize the spin initiator to initiate each movement of one of said wheel and said section indicator.

22. A method of operating a gaming device, said method comprising:

(a) causing at least one display device to display an award distributor in a game, said award distributor including an award wheel which includes:

(i) a plurality of sections displayed in a predetermined arrangement on said award distributor, said predetermined arrangement including each of the sections being in a set position relative to each other section of said award distributor, each of said sections defined by one of a plurality of first coordinates and one of a plurality of second coordinates, wherein:

(A) each first coordinate is associated with one of a first plurality of groups of the sections, each said group of the first plurality of groups including a plurality of the sections, and each second coordinate is associated with one of a second plurality of group of sections, each said group of the second plurality of groups including a plurality of sections, and (ii) a plurality of symbols, each of said symbols associated with one of a plurality of awards, wherein each of said plurality of sections of said award distributor is associated with one of said symbols;

(b) causing the at least one display device to display said plurality of symbols and the awards associated with each of said symbols on the award distributor to a player upon initiation of a play of the game;

(c) causing a section indicator associated with the award distributor to indicate one of said plurality of sections of the award distributor in said play of the game by:

(i) determining one of the first coordinates, (ii) independently determining one of the second coordinates of one of the sections in the group of sections associated with the determined first coordinate, and (iii) causing the section indicator to indicate the section defined by the determined first and second coordinates; and (d) providing to the player the award associated with the symbol of the indicated section.

23. The method of claim 22, which includes associating a probability of being determined with each of the first and second coordinates.

24. The method of claim 23, wherein a plurality of the probabilities of being determined associated with the first and second coordinates are the same.

25. The method of claim 23, wherein all of the probabilities of being determined associated with the first and second coordinates are the same.

26. The method of claim 25, which includes associating a probability of being indicated by the section indicator with each of the sections and determining the first and second coordinates based on said probabilities.

27. The method of claim 22, wherein one of the sections includes a terminator symbol.

28. The method of claim 27, which includes associating a probability of being indicated by the section indicator with each of the sections, wherein the probability associated with the section including the terminator symbol is greater than the probabilities associated with a plurality of the other sections.

29. The method of claim 27, which includes associating a probability of being indicated by the section indicator with each of the sections, wherein the probability associated with the section including the terminator symbol is greater than the probabilities associated with all of the other sections.

30. The method of claim 22, which includes selecting at least one of the awards from the group consisting of: a value, a modifier, a multiplier, a free activation, a free spin and a free game.

31. The method of claim 22, which includes associating a probability of being indicated by the section indicator with each of the awards.

32. The method of claim 22, which includes picking a total award from a plurality of potential total awards and repeatedly causing the section indicator to indicate sections of the award distributor until the awards associated with the symbols on the indicated sections accumulate to the total award.

33. The method of claim 22, which includes randomly determining the first and second coordinates.

34. The method of claim 22, wherein the symbols are game elements.

35. The method of claim 22, wherein the section indicator includes at least one illumination device and which includes causing the section indicator to illuminate the sections of the award distributor.

36. The method of claim 22, wherein the section indicator includes at least one illumination device associated with each of the sections and which includes causing the section indicator to illuminate the sections of the award distributor.

37. The method of claim 22, wherein the section indicator includes a plurality of illumination devices and which includes causing the section indicator to simultaneously illuminate a plurality of the sections of the award distributor.

38. The method of claim 22, wherein the section indicator includes a plurality of illumination devices and which includes causing the section indicator to alternately illuminate a plurality of the sections of the award distributor.

39. The method of claim 22, wherein a plurality of the sections include a terminator symbol.

40. The method of claim 39, which includes associating a probability of being indicated by the section indicator with each of the sections, wherein the probabilities associated with the sections including the terminator symbols are greater than the probabilities associated with a plurality of the other sections.

41. The method of claim 22, which includes associating a probability of being indicated by the section indicator with each of the sections, wherein the probabilities associated with the sections including the terminator symbols are greater than the probabilities associated with all of the other sections.

42. The method of claim 22, which includes enabling the player to use a spin initiator to initiate each movement of one of said award wheel and said section indicator.

43. The method of claim 22, wherein (a) to (d) are provided through a data network.

44. The method of claim 43, wherein the data network is an internet.

45. The gaming device of claim 5, wherein after the section defined by the determined first and second coordinates is indicated, the probability of being indicated by the section indicator associated with at least one of said plurality of sections changes, and the plurality of instructions, when executed by the at least one processor, cause the at least one processor to operate with the at least one display device to cause a subsequent indication of one of said plurality of sections based on said probabilities associated with the sections for said subsequent indication.

46. The method of claim 26, which includes, after indicating the section defined by the determined first and second coordinates, changing the probability of being indicated by the section indicator associated with at least one of said plurality of sections for a subsequent indication of one of said plurality of sections.

* * * * *

UNITED STATES PATENT AND TRADEMARK OFFICE
CERTIFICATE OF CORRECTION

PATENT NO. : 7,708,628 B2
APPLICATION NO. : 10/630529
DATED : May 4, 2010
INVENTOR(S) : Anthony J. Baerlocher It is certified that error appears in the above-identified patent and that said Letters Patent is hereby corrected as shown below:

In Claim 22, Column 13, line 3, insert --(B)-- before "each".

Signed and Sealed this

Twenty-ninth Day of June, 2010

David J. Kappos
*Director of the United States Patent and Trademark Office*